United States Patent
Momchilov et al.

(10) Patent No.: US 11,893,405 B2
(45) Date of Patent: Feb. 6, 2024

(54) WORKSPACE RESILIENCY WITH MULTI-FEED STATUS RESOURCE CACHING

(71) Applicant: CITRIX SYSTEMS, INC., Fort Lauderdale, FL (US)

(72) Inventors: Georgy Momchilov, Parkland, FL (US); Avijit Gahtori, Fort Lauderdale, FL (US); Mukund Ingale, Pompano Beach, FL (US)

( * ) Notice: Subject to any disclaimer, the term of this patent is extended or adjusted under 35 U.S.C. 154(b) by 617 days.

(21) Appl. No.: 16/992,393

(22) Filed: Aug. 13, 2020

(65) Prior Publication Data
US 2022/0050699 A1 Feb. 17, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5011* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,448,816 B2* | 9/2016 | Spracklen | G06F 9/452 |
| 10,366,079 B1* | 7/2019 | Xiao | G06F 16/2423 |
| 2014/0111528 A1 | 4/2014 | Lifshitz et al. | |
| 2018/0131579 A1* | 5/2018 | Jacobs | H04L 41/022 |

FOREIGN PATENT DOCUMENTS

WO    WO02065273    8/2002

* cited by examiner

*Primary Examiner* — Lewis A Bullock, Jr.
*Assistant Examiner* — Melissa A Headly

(57) ABSTRACT

A client device includes resource caches, and a processor coupled to the resource caches. The processor receives resources from different resource feeds, and caches user interfaces (UI) of the resources from the different resource feeds, with at least one resource feed having a resource cache separate from the resource cache of the other resource feeds. Statuses of the resource feeds are determined, with at least one status indicating availability of the at least one resource feed having the separate resource cache. UI elements from the separate resource cache are retrieved for display in response to the at least one resource feed associated with the separate resource cache not being available.

20 Claims, 17 Drawing Sheets

WORKSPACE RESILIENCY WITH MULTI-FEED STATUS RESOURCE CACHING

TECHNICAL FIELD

The present disclosure relates to virtualization, and more particularly, to resiliency of computing environments.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A client device includes a plurality of resource caches, and a processor coupled to the plurality of resource caches. The processor is configured to receive resources from a plurality of different resource feeds, and cache user interfaces (UI) of the resources from the plurality of different resource feeds, with at least one resource feed having a resource cache separate from the resource cache of the other resource feeds. Statuses of the resource feeds are determined, with at least one status indicating availability of the at least one resource feed having the separate resource cache. The processor retrieving for display UI elements from the separate resource cache in response to the at least one resource feed associated with the separate resource cache not being available.

Each resource feed may have a respective resource cache separate from the resource caches of the other resource feeds. The processor may be further configured to determine the status of each resource feed, and in response to the resource feeds that are not available, retrieve for display the UI elements from the respective resource caches of the resource feeds that are not available.

The at least one resource feed having the separate resource cache is not available and the at least one resource associated therewith is leasable, and wherein the processor may be further configured to display the UI elements.

The at least one resource feed having the separate resource cache is not available and the at least one resource associated therewith is not leasable, and wherein the processor may be further configured to display the UI elements as at least one of unavailable, unusable, grayed-out and not launchable.

The processor may be further configured to determine static assets and dynamic assets in the resources of the plurality of different resource feeds. The static assets include application code. The dynamic assets include at least one of application icons, desktop icons, file icons, resource names, and notifications. The resource names may be published application or desktop names, for example.

The plurality of resource caches may comprise a static assets resource cache and a plurality of dynamic assets resource caches, with at least one of the dynamic assets resource caches corresponding to a particular resource feed. The processor may be further configured to cache the static assets in the static assets resource cache, and cache the dynamic assets in the plurality of dynamic assets resource caches.

The processor may be further configured to determine a status of the client device having a network connection to cloud services, and display an offline banner notifying a user that the client device is off-line and the resources may not be available in response to there being no network connection.

The processor may be further configured to determine a health status of a cloud service the client device is connected to, and display an offline banner notifying a user that the client device is off-line and the resources may not be available in response to the health status of the cloud service indicating that the cloud service is unavailable.

A cloud-based authentication of the user to launch a particular resource may not be available in response to there being no network connection. The processor may be further configured to prompt the user for local authentication for the particular resource to be launched, with the local authentication including at least one of a local personal identification number (PIN) and biometrics.

At least one of the resources may require user authentication before launching the resource, with the authentication being provided by using an authentication protocol or by using a connection lease. The processor may be configured to start with using the authentication protocol first before falling back to the connection lease in response to the resource feed providing the resource to be launched being available, and start with using the connection lease first before falling back to the authentication protocol in response to the resource feed providing the resource to be launched not being available.

Another aspect is directed to a method comprising receiving resources from a plurality of different resource feeds, and caching user interfaces (UI) of the resources from the plurality of different resource feeds, with at least one resource feed having a resource cache separate from the resource cache of the other resource feeds. The method further includes determining status of the resource feeds, with at least one status indicating availability of the at least one resource feed having the separate resource cache. UI elements from the separate resource cache are retrieved for display in response to the at least one resource feed associated with the separate resource cache not being available.

Yet another aspect is directed to a computing system comprising a server configured to receive resources from a plurality of different resource feeds, and a client device as defined above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

In desktop virtualization, a user of a client device accesses a workspace. The workspace may include, for example, virtual apps and desktops from the cloud, virtual apps and desktops from on-premises, endpoint management services, content collaboration services, and SaaS apps.

Connection leases can be used to authorize the user to access the resources, and to provide the ability to launch a resource as long as the user can click on a visualization of the resource. The visualization is the user interface (UI) of the resource, such as an icon.

Workspace resiliency with connection leases requires not only connection leases containing pre-defined resource entitlements but also resilient UI that allows the user to see and interface with the UI assets in an offline mode or in a cloud outage mode. In an offline mode, there is no Internet connection which means there is no network connection to cloud services. In a cloud outage mode, there is an Internet connection providing a network connection to cloud services, but particular services within the cloud services may be experiencing complete or partial outage.

Currently, UI caching is achieved via progressive web app (PWA) service workers. Service workers are scripts that run in the background in the user's browser. Service workers enable applications to control network requests, cache those requests to improve performance, and provide offline access to cached content.

A drawback of progressive web app caching is that the progressive web app is not aware of the granularity of different workspace resource feeds. In other words, progressive web app caching is not aware of the existence of multiple resource feeds with individual independent health status. As a result, if a single resource feed is down or intermittently unhealthy (e.g. returns errors or empty resource enumeration results under load), but otherwise network connectivity to the workspace is present, then the client device still consumes resources from the network but the resources from the unavailable resource feed disappear as opposed to being presented from previously populated cache.

The techniques and teachings of the present disclosure provide the ability for the client device to recognize when a specific resource feed is down and retrieve the respective UI assets from the cache. This enables workspace resiliency on a per feed basis without compromising security and user experience.

Figure 1:
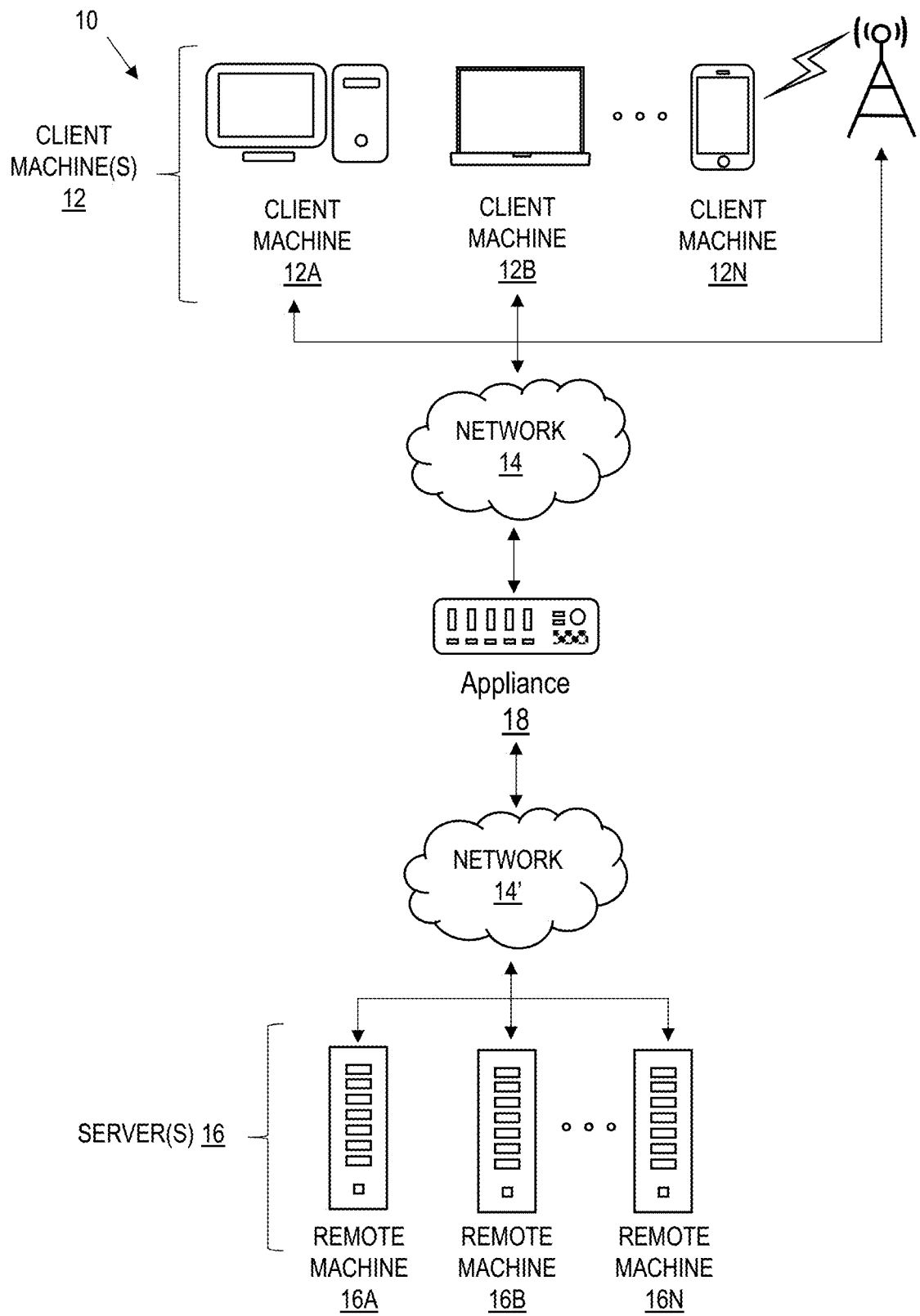
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
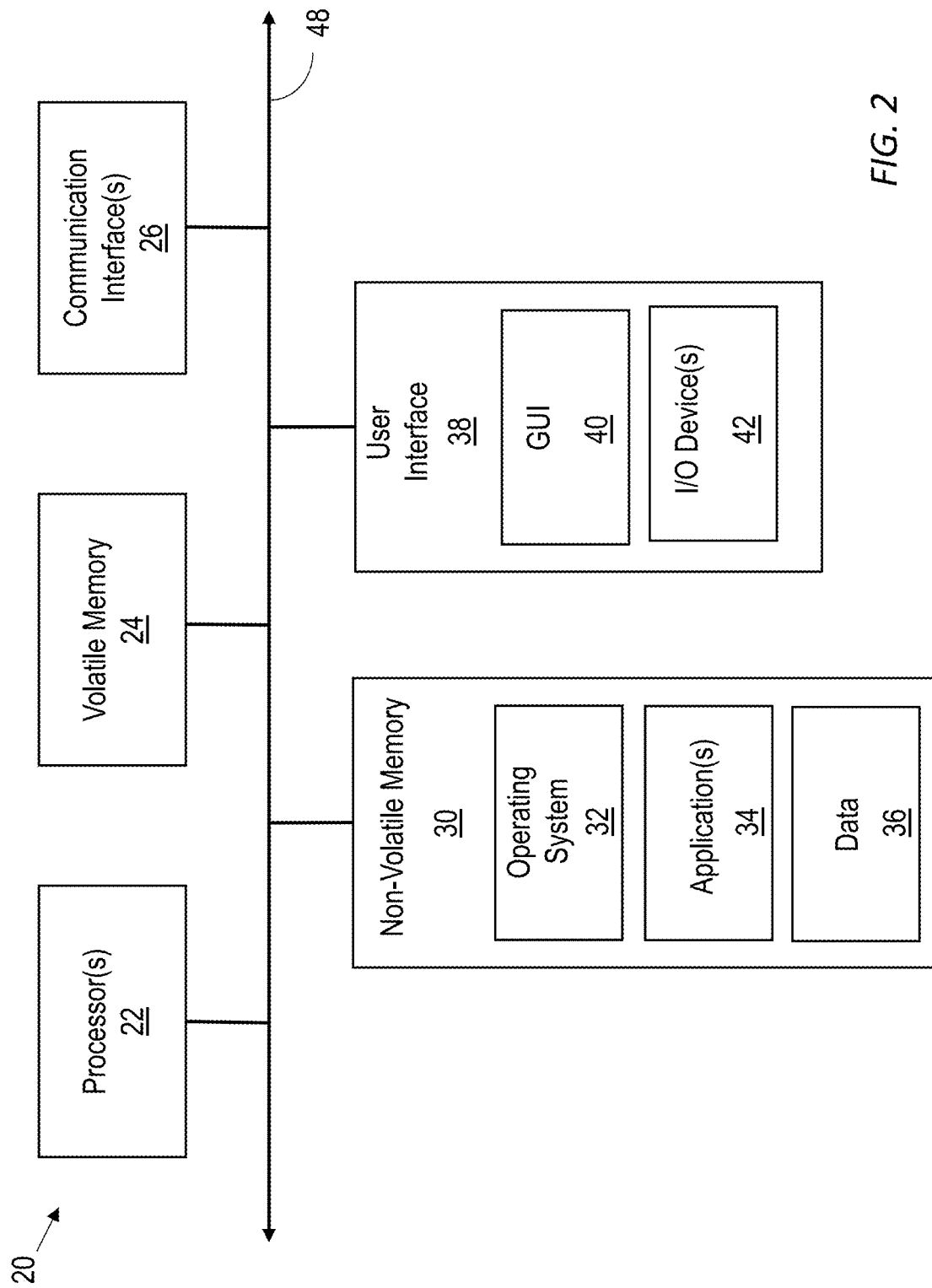
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
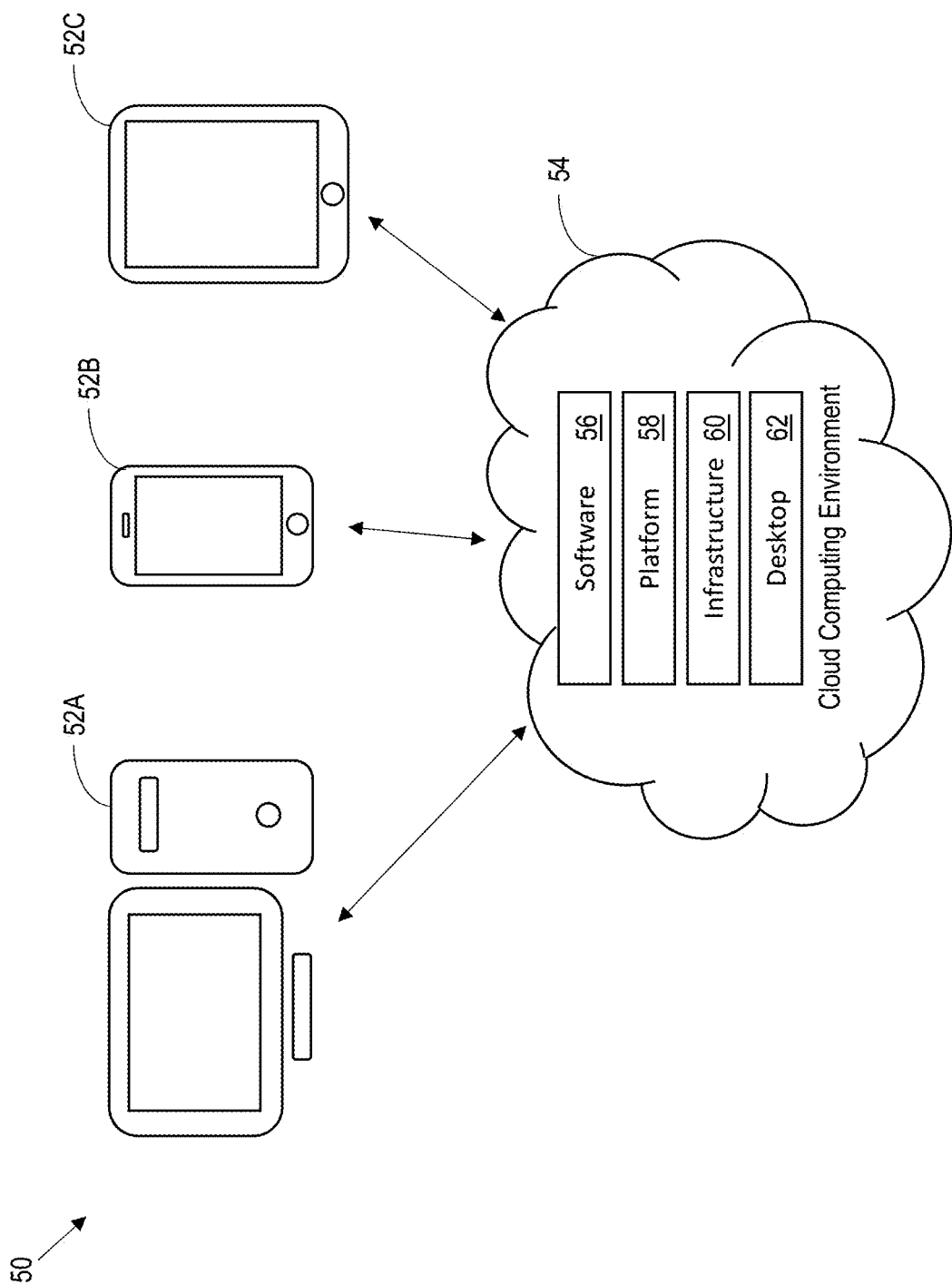
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
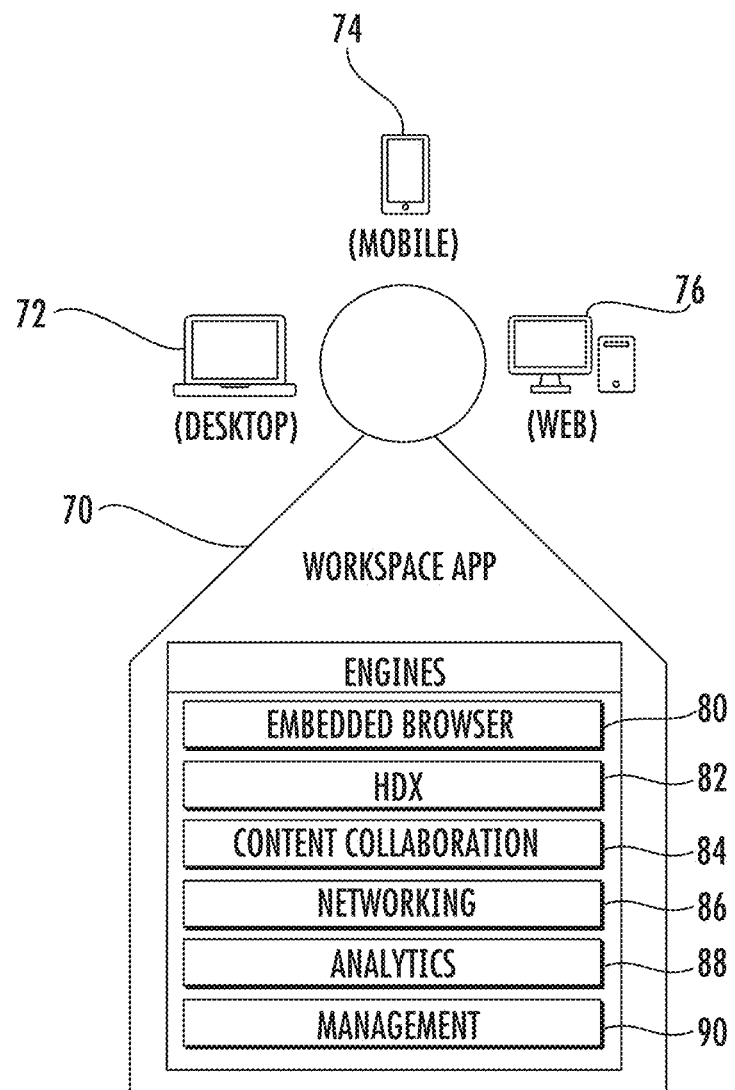
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
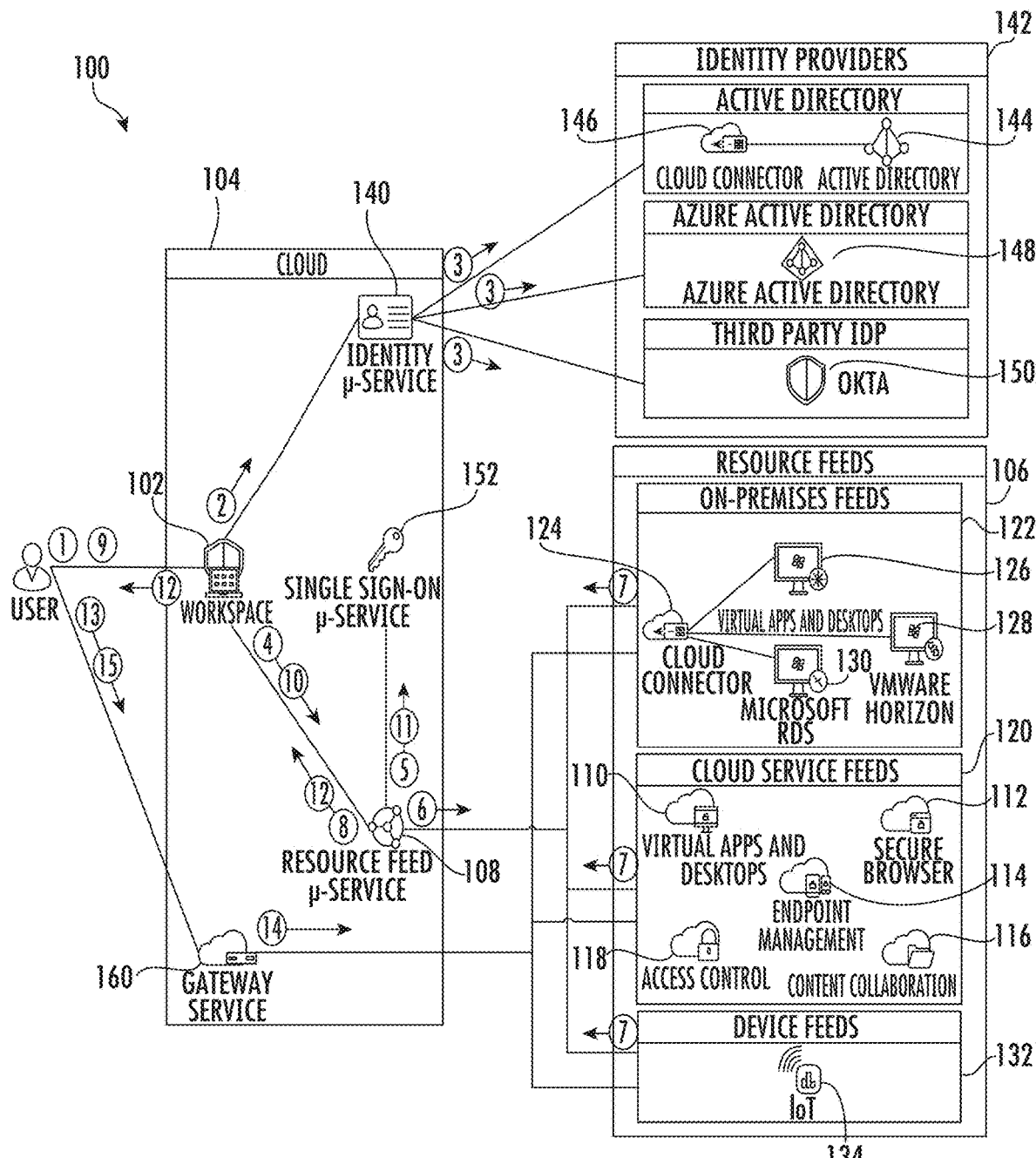
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
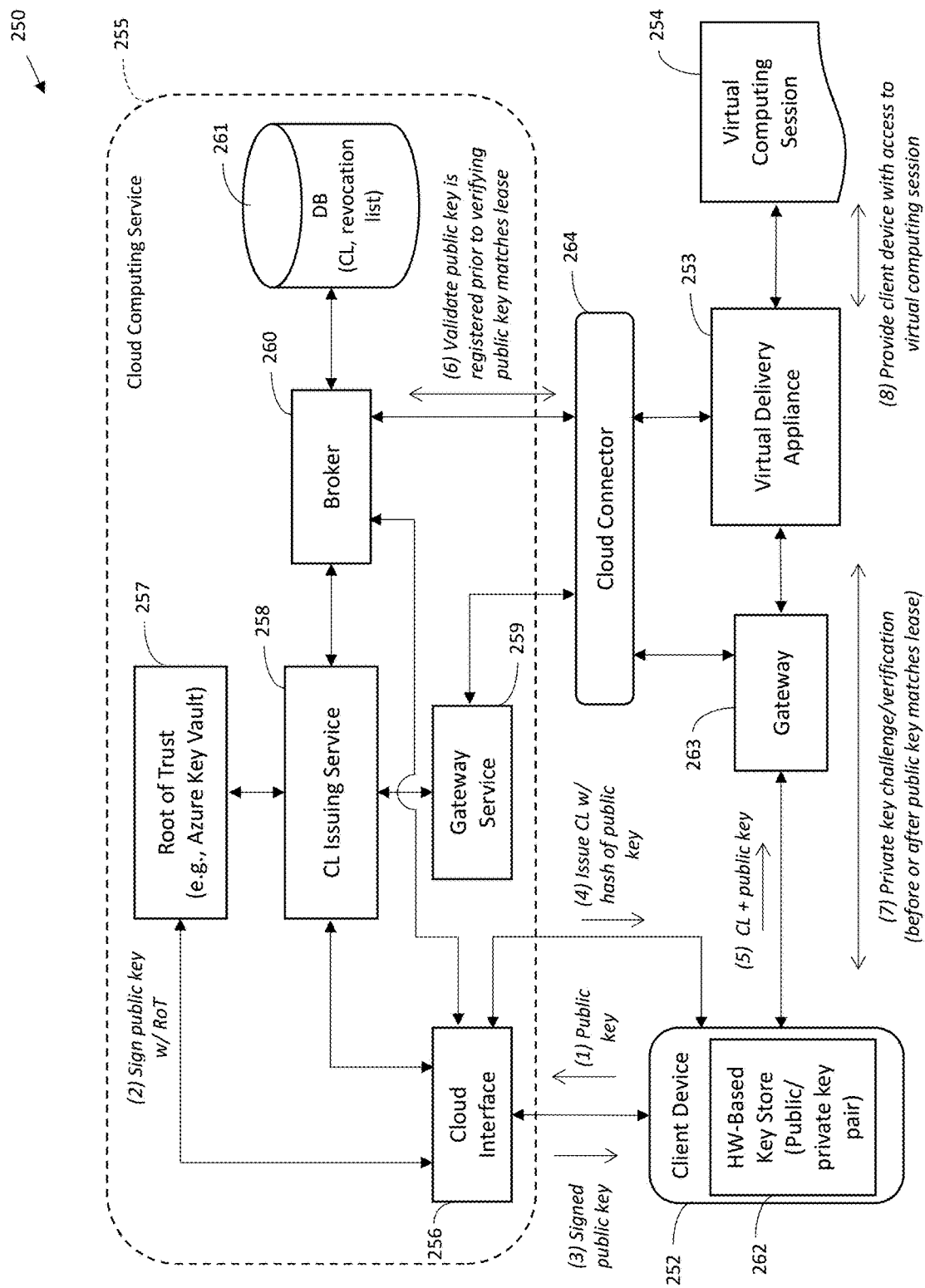
FIG. 6 is a schematic block diagram of a computing system providing a connection lease architecture for accessing virtual computing sessions in which various aspects of the disclosure may be implemented.

Turning now to FIG. 6, a computing system 250 providing a connection lease architecture for accessing virtual computing sessions will be discussed. The computing system 250 may be implemented using the above described computing devices, and in some implementations within the workspace infrastructure.

Access to virtual computing sessions may be provided using Citrix Virtual Apps and Desktops (CVAD) from Citrix Systems, Inc. Citrix Virtual Apps is an application virtualization solution that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or a traditional software configuration.

Such computer virtualization infrastructures may traditionally utilize Independent Computing Architecture (ICA) protocol and ICA files for authenticating the client device 252 to access the virtual computing session 254 and computing resources to which the user is entitled. ICA is a protocol designed for transmitting Windows graphical display data as well as user input over a network. ICA files contain short-lived Secure Ticket Authority (STA) and logon tickets. The STA ticket may be used to authorize a connection to a virtual delivery appliance 253 (e.g., Citrix Virtual Delivery Agent (VDA)) via a Gateway 263 (e.g., Citrix Gateway) or via Gateway Service 259 (e.g., Citrix Gateway Service). The logon ticket may single-sign-on (SSOn) the user into the virtual computing session 254. In the case of CVAD, this is done through a "high-definition" experience (HDX) session, which may be available to users of centralized applications and desktops, on different client devices and over different networks. Citrix HDX is built on top of the ICA remoting protocol.

With any network infrastructure, remote or otherwise, security from external attacks is always a significant concern. Moreover, connection leases are long-lived (e.g., a few hours to weeks based on policies), and the attack opportunity window is therefore increased. The security requirements are also increased compared to traditional ICA files. Therefore, connection leases are encrypted and signed.

Connection leases may also be revoked to cope with events such as stolen devices, compromised user accounts, closed user accounts, etc. Connection lease revocation is applied when a client/endpoint device or host is online with respect to a Connection Lease Issuing Service (CLIS) 258 or broker 260. However, the CLIS 258 or broker 260 does not typically have to be online for a client device 252 to use a previously issued connection lease, since connection leases are meant to be used in an offline mode.

The connection lease issuing service (CLIS) 258 or broker 260 may store and update published resource entitlements for the client device 252. The published resource entitlements may relate to the virtual computing resources (e.g., SaaS apps, DaaS sessions, virtual apps/desktops, etc.) that the client device 252 is permitted or authorized to access. The client device 252 may be a desktop or a laptop computer, a tablet computer, a smartphone, etc.

The computing system 250 includes a virtual delivery appliance 253 that communicates with the client device 252 via a network (e.g., the Internet or Web). The virtual delivery appliance 253 is configured to receive a connection request from the client device 252 that includes connection leases issued based upon the respective published resource entitlements for the client device 252. In an example implementation, the virtual delivery appliance 253 may be implemented using Citrix Virtual Delivery Agents (VDAs), for example, although other suitable virtual delivery appliances may be used in different implementations.

The virtual delivery appliance 253 is also configured to request validation of the connection leases from the broker 260, and provide the client device 252 with access to a virtual computing session 254 corresponding to the published resource entitlements responsive to validation of connection leases from the broker 260. In this regard, responsive to validation requests from the virtual delivery appliance 253, the connection leases are compared to the updated published resource entitlements that are being maintained so as to validate the virtual computing session requests.

Independent flow sequences for accessing a virtual computing session 254 within the computing system 250 will be discussed. In the illustrated example, the lease generation functions are performed within a cloud computing service 255 (e.g., Citrix Cloud) which illustratively includes a cloud interface 256 configured to interface with the client device 252 for enrollment and lease generation.

In an example implementation, the cloud interface 256 may be implemented with Citrix Workspace, and the client device 252 may be running Citrix Workspace App, although other suitable platforms may be used in different embodiments. The cloud computing service 255 further illustratively includes a root of trust (RoT) 257, Connection Lease Issuing Service (CLIS) 258, Gateway Service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 operating system performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used.

As background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262.

This process, referred to as wrapping or binding a key, can help protect the key from disclosure. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

The client device 252 provides its public key to the cloud interface 256 (step (1) in FIG. 6), which then has the public key signed by the RoT 257 (step (2) in FIG. 6) and returns the signed public key to the client device (step (3) in FIG. 6). Having the public key signed by the RoT 257 is significant because the gateway 263, the virtual delivery appliance 253, and the broker 260 also trust the RoT and can therefore use its signature to authenticate the client device public key.

The client device 252 may then communicate with the CLIS 258 via the cloud interface 256 to obtain the connection lease (step (4) in FIG. 6). The client device 252 public key may be provided to a host or virtual delivery appliance 253 (e.g., Citrix VDA) either indirectly via the broker 260 or directly by the client device. If the client device 252 public key is indirectly provided to the virtual delivery appliance 253, then the security associated with the client-to-broker communications and virtual deliver appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 6). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand.

Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communications between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 6). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g., after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7)). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired.

Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

Figure 7:
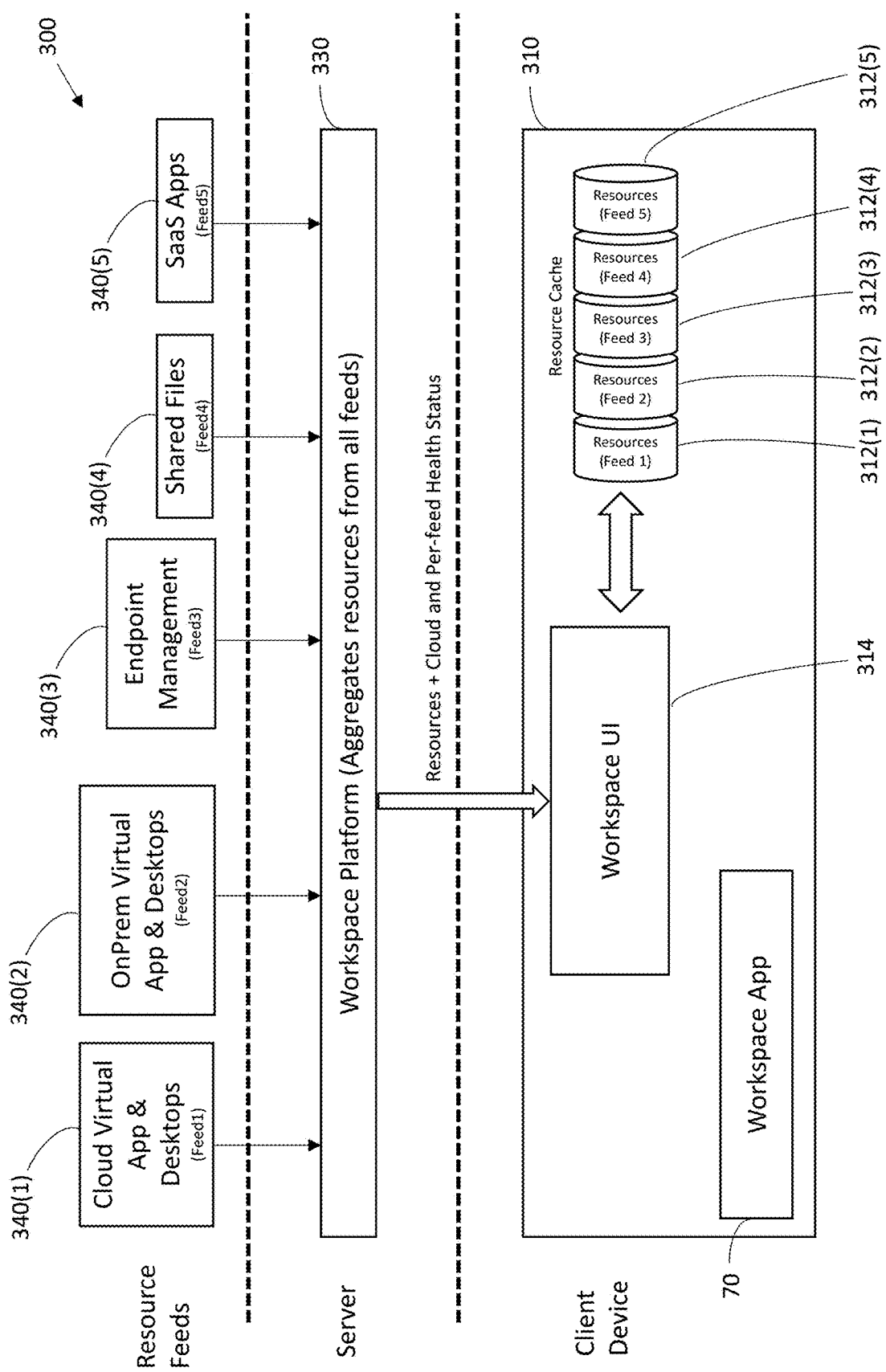
FIG. 7 is a schematic block diagram of a computing system providing workspace resiliency with multi-feed status resource caching in which various aspects of the disclosure may be implemented.

Referring now to FIG. 7, the illustrated computing system 300 provides the ability for a client device 310 to recognize when specific resource feeds 340(1)-340(5) are down and retrieve the UI assets from the respective resource caches 312(1)-312(5). This enables workspace resiliency on a per feed basis without compromising security and user experience.

A server 330, e.g. a workspace platform 330, is configured to aggregate or receive resources from different resource feeds 340(1)-340(5). A resource feed 340 represents a uniform abstraction for any type of cloud service, on-premises service or appliance that provides published resources to be delivered to a user. The different resource feeds 340(1)-340(5) may be provided by different cloud or on-premises services and may be configured based on customer and user entitlements. In some embodiments, the server 330 may present the received resources in different UI panes or views for each resource feed, where the UI panes are part of a single Workspace UI 314. In other embodiments, the server 330 may aggregate received resources from different resource feeds 340(1)-340(5) into a single pane. For example, the server 330 may aggregate virtual apps and desktops and SaaS apps into a single UI pane for apps and desktops. The illustrated resource feeds 340(1)-340(5) are not to be limiting. Other types of resource feeds may be used in addition to or in place of the illustrated resource feeds 340(1)-340(5).

Resource feed 1 340(1) provides virtual apps and desktops from the cloud. The virtual apps and desktops may be Citrix Virtual Apps and Desktops (CVAD) from Citrix Systems, Inc. The cloud may be Citrix Cloud, for example. In the case of Citrix cloud, the Citrix Workspace app (CWA) 70 may be used as a single-entry point for bringing apps, files and desktops together to deliver a unified experience, although other suitable platforms may be used in different embodiments. As discussed above and, as illustrated in FIG. 7, the Citrix Workspace App (CWA) 70 may be generally referred to as the workspace app 70.

Resource feed 2 340(2) provides virtual apps and desktops from an on-premises deployment. The virtual apps and desktops may also be Citrix Virtual Apps and Desktops (CVRD). Resource feed 3 340(3) provides endpoint management, such as Citrix Endpoint Management (CEM). Endpoint management enables a single unified workspace from any device, whether laptops, smart phones, tablets or any other device. Resource feed 4 340(4) provides content collaboration services, such as Citrix Files, formerly known as ShareFile. The content collaboration services may be generally referred to as shared filed. Resource feed 5 340(5) provides SaaS apps.

The client device 310 is configured to cache or otherwise store in memory user interfaces (UI) 314 of the resources from the different resource feeds 340(1)-340(5), with individual resource feeds having a respective resource cache 312(1)-312(5) separate from the resource caches of the other resource feeds. A health status of resource feeds 340(1)-340(5) is determined by the client device 310. The health status indicates availability of a particular resource feed. The health status of a resource feed 340(1)-340(5) may also be generally referred to as a status. Health status checks can be initiated by the workspace UI 314 and/or can be collaboratively performed by the server (workspace platform) 330, as will be further described later in FIG. 12.

In response to the resource feeds that are not available, the client device 310 retrieves UI elements from the resource caches of the resource feeds that are not available for display. For the resource feeds that are available, the client device 310 bypasses the resource caches for these feeds and displays live UI elements.

Figure 8:
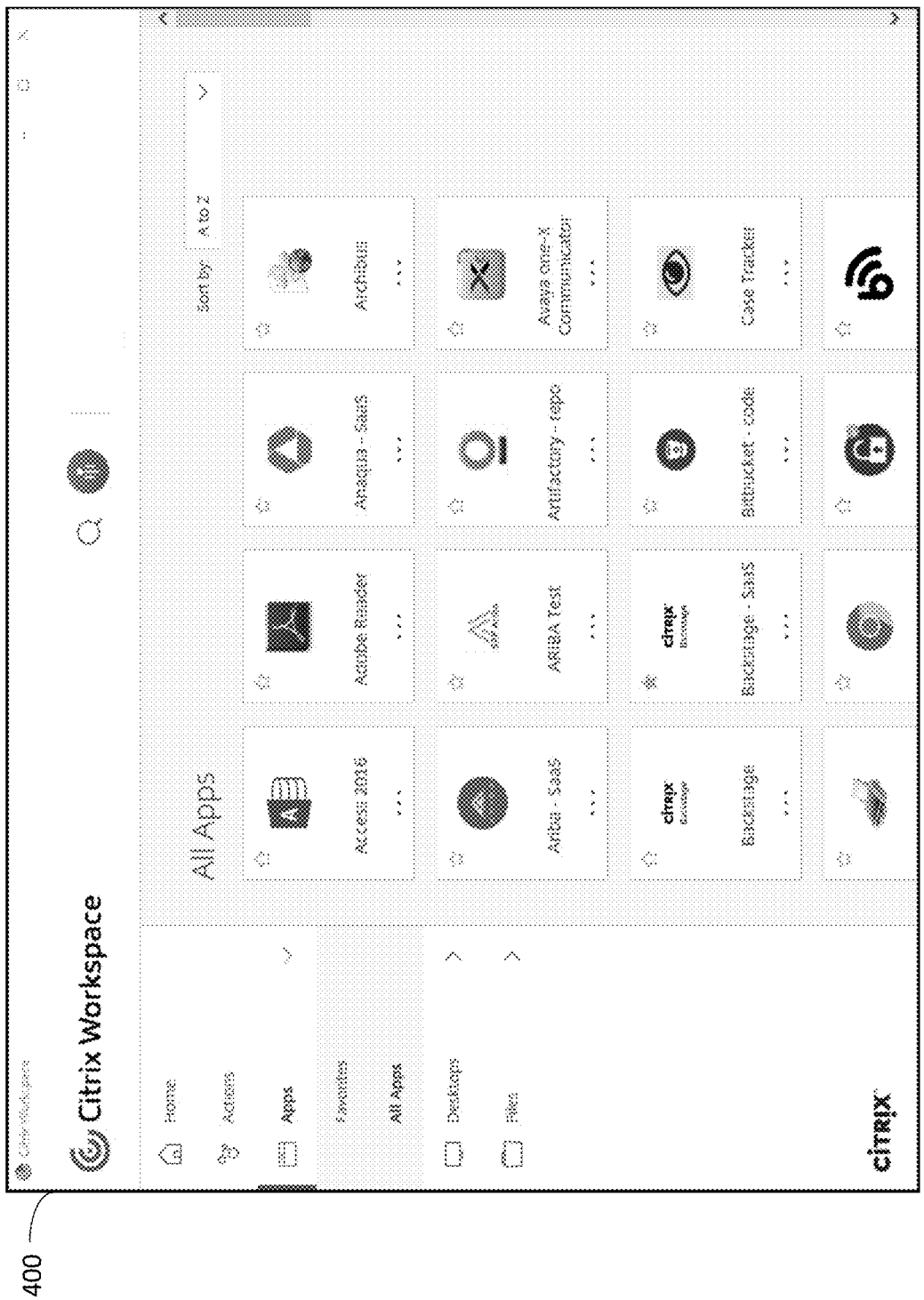
FIG. 8 is a screenshot providing user interface (UI) elements for a resource feed down scenario along with resource feeds that are available to the client device illustrated in FIG. 7.

An illustrated user interface 314 that includes a resource feed down and available resource feeds is provided by the screenshot 400 in FIG. 8. The icons and resource names correspond to the apps and desktops that may be available to the user. In other embodiments only icons or only resource names may be presented. Since there is nothing secure or private about the icons and resource names, they may be displayed without user authentication. However, user authentication may be required for the user to access a particular resource.

As will be explained in detail below, the computing system 300 provides the ability for a user to see the user interface (UI) 314 from a resource feed in an offline mode or a cloud outage mode without authentication. This is based on the client device 310 including a processor configured to distinguish between static assets and dynamic assets, and with the dynamic assets being cached on a per feed basis and including status. Even though the user is able to see the cached assets without authentication, authentication to the virtual delivery appliance is still required to access the resource represented by the icon and/or resource name.

Static assets are part of the application user interface 314 and include application code, such as HTML and JavaScript (JS) of the application. Authentication is not required, since the application code itself does not contain user-specific information nor any other sensitive information, but rather the application business logic and UI. In some embodiments the application code may contain customer-specific information that is not sensitive in nature, e.g. background color, company logo or other customizations. In addition, the application code may contain code, e.g. Authentication Manager code, which enables the execution of the authentication process. Furthermore, the application is rarely changed unless the application has been upgraded. Dynamic assets require authentication to obtain from the Workspace, and include icons, resource names and additional resource metadata corresponding to files, applications and desktops. Dynamic assets also include actions or notifications. An example notification may be for the user to approve an expense report. The additional resource metadata enumerated as part of the dynamic assets may not be for display purposes. For example, the resource metadata may contain information indicating to the workspace app 70 and the workspace UI 314 weather a particular published resource is leasable (i.e. can be launched in offline mode), the order of precedence in which connection descriptor files (e.g. ICA files) versus connection leases should be used during a launch process, etc.

As noted above, there is no Internet connection in the offline mode. Consequently, there is no network connection from the workspace app 70 to cloud services. However, connectivity to VDAs may still exist on LANs. In the cloud outage mode, there is an Internet connection providing a network connection to cloud services, but particular services within the cloud services may be experiencing complete or partial outage. Connectivity to gateway service, on-premises Gateways, Connectors and/or VDAs may still exist.

In addition to multi-feed resource caching with an understanding of cloud and individual feed health status for enabling resiliency on a per feed basis, other features of the computing system 300 will also be discussed in detail below. One such feature is group level resource caching. Group level resource caching is applicable to kiosk or shared device use cases. In response to a user logging off the kiosk or shared device, the user's individual resource cache is emptied but the group-level resource cache remains. Also, the connection leases are issued per group and not to individual users so the shared connection leases remain.

Another feature is secure access to long-lived cache and connection leases using local authentication when the cloud is down. The local authentication may be provided using a local personal identification number (PIN) or biometric in lieu of cloud authentication.

Yet another feature is connect time optimization based on resource cache status. To authenticate the client device 310 to access a virtual computing session 254 and computing resources to which the user is entitled, connection descriptor files, e.g. ICA files, and connection leases are used. Depending on the status of a resource feed, the client device 310 may be instructed to launch an ICA file first followed by launching a connection lease, or the policy may be reversed so that a connection lease is launched first followed by launching an ICA file.

An ICA file is first launched followed by launching a connection lease in a cloud-online condition where the resource is available (i.e., success). In a cloud-online condition where the resource is not available (i.e., failed) or in a cloud-offline condition, then the the policy may be reversed so that a connection lease is launched first followed by launching an ICA file.

Figure 9:
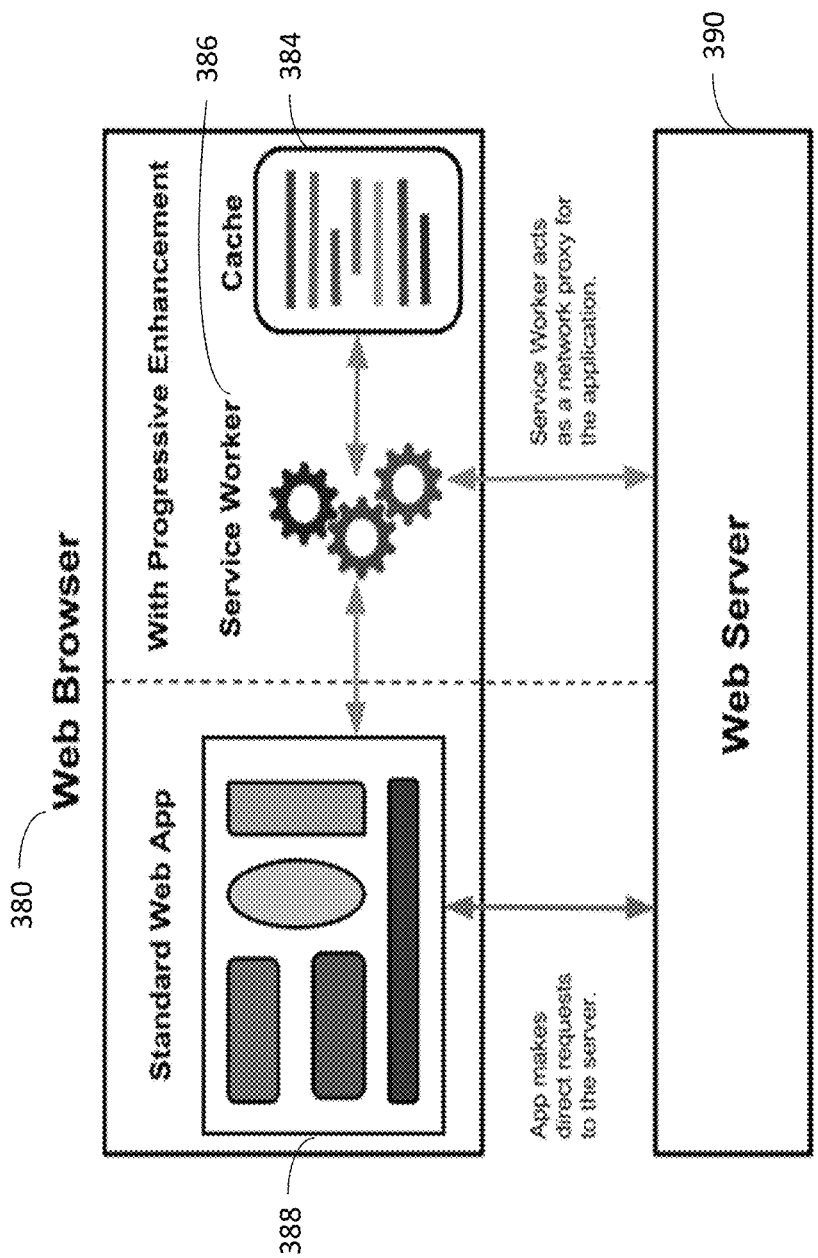
FIG. 9 is a schematic block diagram of a web browser with a progressive web app (PWA) service worker used to cache user interface (UI) of a web application in which various aspects of the disclosure may be implemented.

Progressive Web App (PWA) technology by Google, which includes service workers 386, is currently used for UI caching, as illustrated in FIG. 9. A service worker 386 is a script that runs in the background in a web browser 380 to support one of the main features of progressive web applications, which is the offline work mode. The service worker 386 is a JavaScript file running separately from the web app 388. The service worker 386 acts as a network proxy for the web app 388 and caches UI of the web app in a cache 384. A standard web app 388 makes direct requests to a web server 390. This means that if the network connection is down, a standard web app 388 will fail to load or, if the network outage occurs after the web app 388 has already loaded, then it will fail to fulfill further requests to the web server 390. However, when a web app 388 is enhanced with PWA technology and, in particular, includes a service worker 386 installation, then the service worker 386 acts as a network proxy for the web app 388. A service worker 386 responds to user interactions with the web app 388, including network requests made from pages it serves. If the network is down, the service worker 386 is able to serve requests from the cache 384 that it maintains.

A limitation of current PWA caching is that it does not distinguish between static and dynamic assets. Static assets include application code, whereas dynamic assets include icons, resource names and additional resource matadata corresponding to assets requiring authentication to obtain from the workspace. PWA uses a shared cache 384, and if a single resource feed is down or intermittently unhealthy, but otherwise network connectivity to the workspace is present, then the entire shared cache 384 is invalidated. The client device 310 still consumes resources from the network but the resources from the unavailable resource feed disappear as opposed to being presented from previously populated cache.

Figure 10:
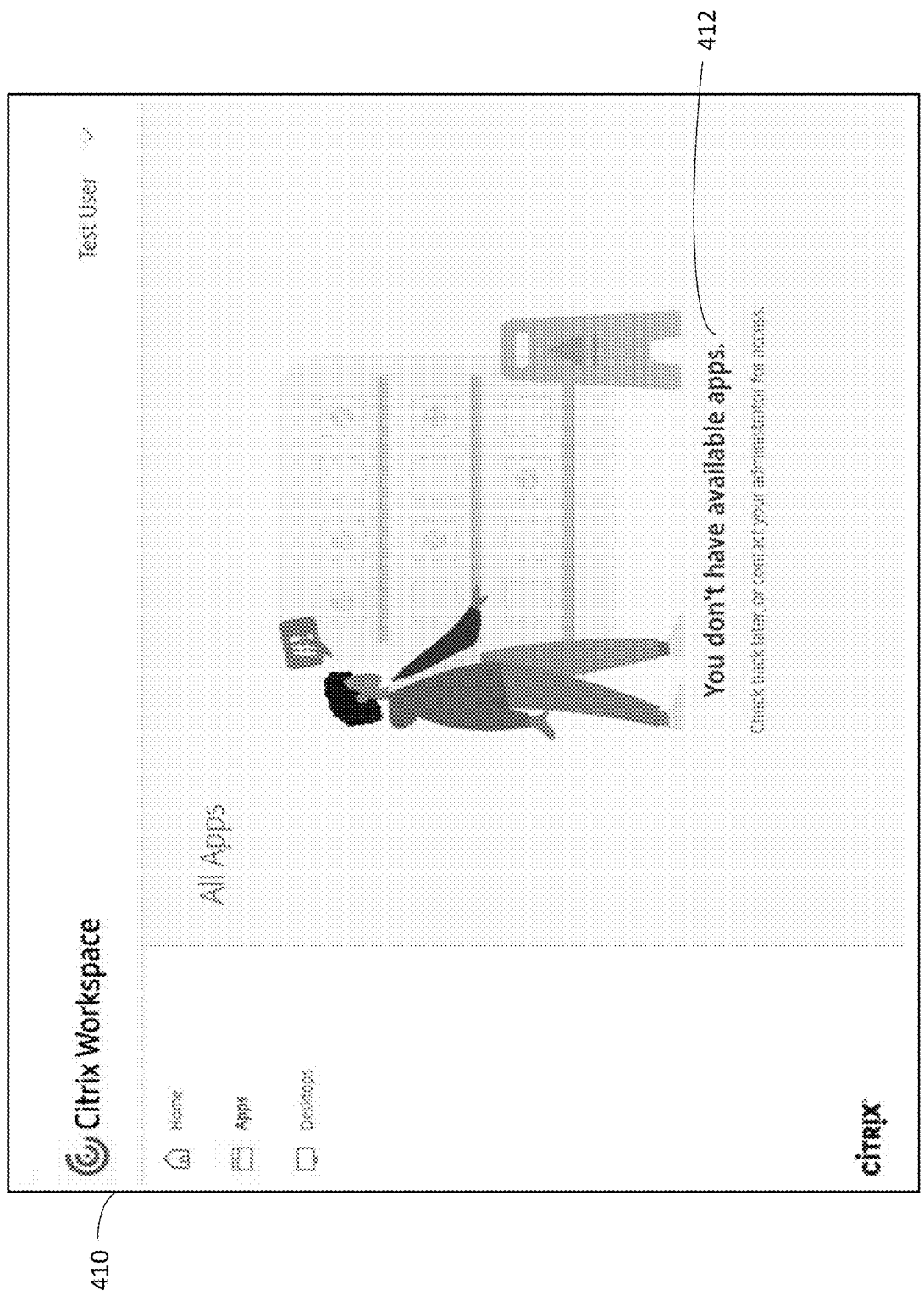
FIG. 10 is a screenshot providing a message that no applications are available based on a resource feed not being available to the web browser illustrated in FIG. 9.

As an example, a client device using current PWA caching is online to the cloud (i.e., Internet connectivity is present), and the Workspace is reachable. However, the Workspace cannot reach a brokering service that issues connection leases to client devices and provides virtual apps and desktops. As a result, the workspace cannot enumerate virtual apps and desktops (e.g., CVAD). Consequently, the workspace shows a tool tip or message 412 to the user as illustrated by screenshot 410 provided in FIG. 10. The message 412 indicates the user needs to contact their administrator to provide access to apps, which is inaccurate, since actually the user already has apps/desktops assigned to them.

Furthermore, if the client device using current PWA caching were to treat an error from any single feed as an indication of the entire workspace being down, e.g., during partial Workspace resource enumeration, then the cache 384 will become stale even for resource feeds that are still available. Thus, failure in one resource feed causes stale cached-based UI for all other feeds, which is a user experience and security issue. For example, failure of an on-prem site causes virtual apps and desktop assets from the cloud to also be consumed from cache 384 and become stale. If changes in user entitlements occur, they would not be reflected in the UI. Likewise, if virtual apps and desktop assets (e.g., CVAD) from the cloud fails, it will cause staleness of non-CVAD cloud assets, as well as aggregated on-prem sites.

Although additional security restrictions would be applied to leasable resources, such as connection lease validation and additional authentication requirement during VDA session establishment, some SaaS/Web apps that do not require gateway authentication will be vulnerable if they are still presented from cache.

Referring back to FIG. 7, different scenarios on what happens when a user opens the workspace app 70 or refreshes an application in offline and cloud outage conditions will now be discussed. A basic assumption is that the user has previously logged in, and the static and dynamic assets have already been cached. This includes a user that has not previously logged out, or has explicitly logged out and is being allowed to come back in. This happens if the user refreshes the application, or reboots the client device 310, or if the user closes and restarts the application.

In one scenario, virtual app and desktop assets from the cloud provide resources that are leasable. The user is allowed to see these assets since these resources have connection leases. Other resource types may also be leasable, e.g., SaaS apps, endpoint management, and non-cloud on-premises virtual apps and desktops. There is no distinction on these resources being made available for viewing and interaction in either an offline mode or a cloud outage mode. The user is not being blocked by any error on seeing the cached assets, including an authentication error. There is no cache encryption if relying on cloud-supplied keys because a fundamental requirement is for the Workspace UI 314 to function in offline and cloud outage conditions, otherwise, cache encryption is possible if relying on local authentication (i.e., local pin or biometrics).

The lifetime of the UI cache (dynamic assets) is independent of the app code (static assets). This is necessary so that when the app code (HTML, JS) is updated, the UI cache 312(1)-312(5) is not flushed. The UI cache 312(1)-312(5) needs to survive past the user logging out. Cache coherency, i.e. synchronization of local and remote state, is maintained via Workspace refresh (UI talking to backend) whenever network connectivity to workspace platform 330 is available.

There is no kiosk or shared device support since the user interface 314 is shown corresponding to the last user because the virtual app and desktop cache is preserved. Cache coherency is maintained. For example, if a user updates favorites or non-favorites while offline, then goes back online, then the updates are propagated to the Workspace. Also, connection lease synch from the cloud to the workspace app 70 is intendent, and may be implemented in type script or JS as part of Workspace UI but by using a hidden browser instance or window.

With the virtual app and desktop assets from the cloud being leasable, in some embodiments, for all other intelligent Workspace assets, the assumption is made that they are not leasable. These assets are sensitive and require authentication. These assets include notifications, actions, and files, for example, and are not presented to the user. Instead, the user is presented with a meaningful error saying that difficulties are being experienced and the user has to go back online and successfully authenticate to see the assets. However, errors should not discourage usage of leasable resources, such as virtual app and desktop (e.g., CVAD) assets from the cloud. In other embodiments, notifications, actions, files and other Workspace assets may also be leasable. Due to the sensitive nature of these assets they may be presented after a local authentication, e.g. using a local PIN or biometric, as previously described, as opposed to a cloud-based authentication.

Assets that are not sensitive do not require authentication to present an icon or resource name, such as CVAD assets from an on-prem site and SaaS/Web apps with or without Gateway requirement. In some embodiments where these assets are not leasable, they are presented as grayed-out (i.e. unavailable, unusable), disallowing launch. As illustrated by the screenshot 420 in FIG. 11, a tool tip 422 could say "This app is currently unavailable." The user must go back online and successfully authenticate for the icons to be un-grayed and allow launch. There may be a number of reasons why the app is not leasable, such as an older infrastructure is being used or the app simply does not support leasing.

There are different options for the user to refresh the Workspace UI 314. For example, a ribbon/banner 424 provided by the screenshot 420 illustrated in FIG. 11 may be displayed at the top of the screen saying "Unable to connect to some of your resources. Some virtual apps and desktops may still be available. Reconnect." The user can either manually click on reconnect in the UI to reconnect, or the user can go to the menu to refresh. Also, a refresh may be done in response to detecting automatically a network recovery. Also, push notifications from the Workspace, or another cloud service, or a periodic heartbeat from the Workspace app 70, may be used to account for an online but cloud outage condition.

In addition, the Workspace UI supports both CVAD-only and mixed entitlements, such as Workspace Intelligence (WSi) features, Citrix Files, and CVAD.

Another scenario is when a user logs out. This scenario involves an unauthenticated returning user after a previous explicit log out/sign out. In this case, a user explicitly logs out, then the connection leases are cleared but the UI cache is being kept for performance reasons. What this means is that if the user tries to come back the user's authentication could be blocked. But if the user does authenticate, the UI cache allows for better performance. In other words, the workspace app 70 does not have to go all the way to the cloud to get all these assets. It can present them right away.

Another scenario is switching users. Switching users is not supported in offline or cloud outage mode. To support a user switching in offline/cloud outage mode, the workspace app 70 could present a local PIN or biometric to determine the user's identity. This allows the UI to refresh from the resource cache, and consequently, connection leases are used. Support for switching users during offline or cloud outage conditions may be controlled by policy.

Yet another scenario is a user switching stores. If a user has already set up different stores and has not logged out from them then switching stores will be supported. A store is an abstraction of a set of apps and desktops that have been published. For example, the user may point to Workspace in the cloud as one store, and then the user may point to an on-premises store. The user can switch between the different stores. Each store will have multiple feeds. Some of the feeds could be from the cloud or some of them could be on-premises. In another embodiment switching stores may be supported even after logging out based on a local PIN or biometric to determine the user's identity. In yet another embodiment the user may have a single store account (not multiple store accounts), and a single store could be aggregating different feeds.

Having described above the basic offline or complete Workspace outage scenarios, cases where the cloud may be online but there could be a partial feed failure from one or more resource providers will now be discussed. This corresponds to multi-feed aware resource caching. For example, the cloud broker may be down for the virtual apps and desktops (e.g., CVAD), and the workspace app 70 is online and the workspace store is reachable. However, the workspace cannot reach the cloud broker XML service. As a result, the workspace cannot enumerate the virtual apps and desktops. The workspace will generate a ribbon/banner to notify the user that some of the resources may be available while some of the resources may not be available. The ribbon/banner is displayed as opposed to displaying no resources are available (current undesired behavior), and the cached virtual apps and desktops are shown.

Figure 12:
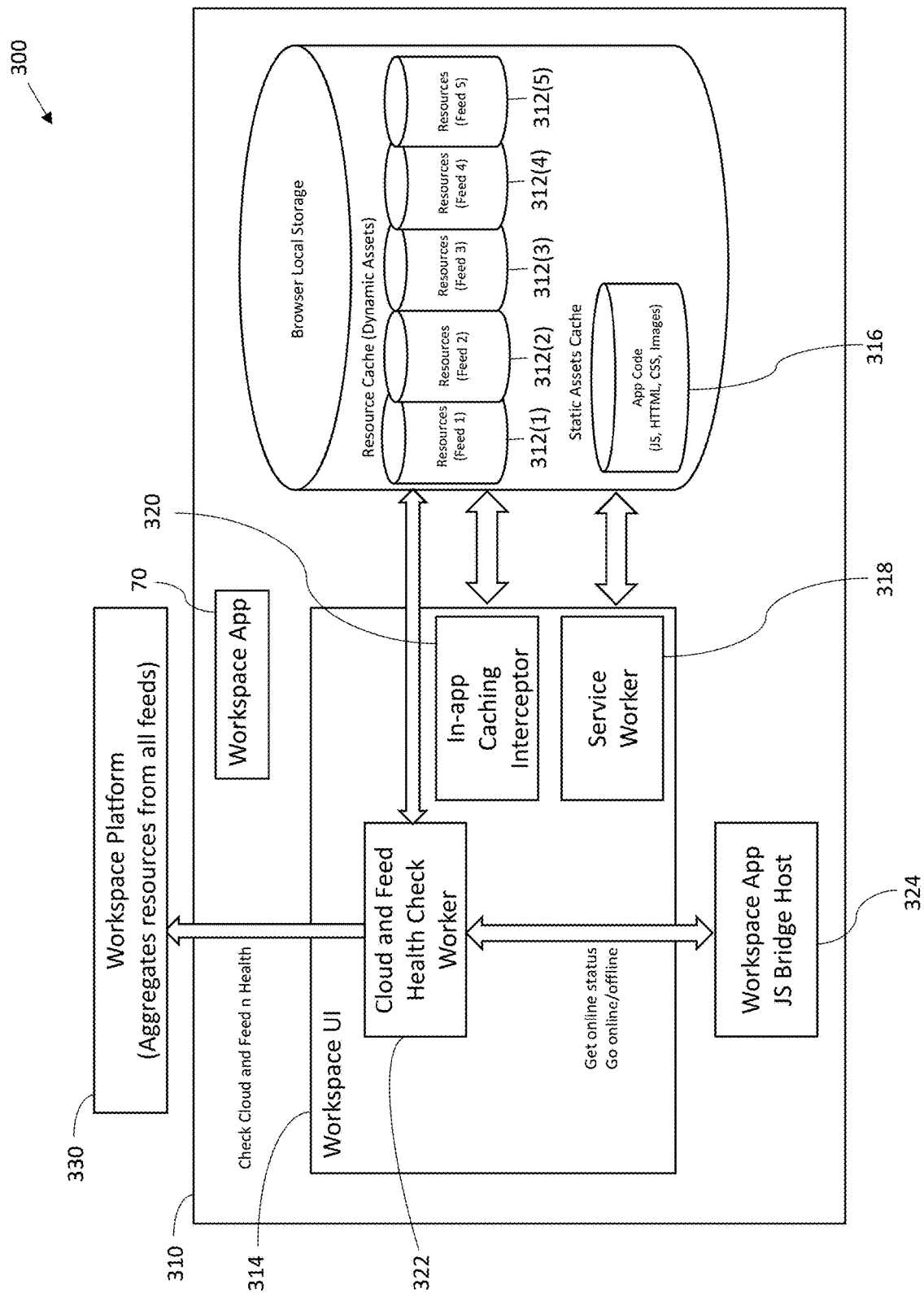
FIG. 12 is a more detailed schematic block diagram of the client device illustrated in FIG. 7.

Referring now to FIG. 12, obtaining per-feed status for the resources, performing workspace-cloud-overall and per-feed health checks, and maintaining per-feed resource caching by the client device 310 in the computing system 300 will be discussed. The same computing system 300 provided in FIG. 7 focused more on aggregating or receiving the multiple feeds 340(1)-340(5) by the workspace platform 330 for the client device 310.

As noted above, the client device 310 includes a processor configured to distinguish between static assets and dynamic assets, and with the dynamic assets being cached on a per feed status. The static assets are stored in a shared static assets cache 316, and the dynamic assets are stored in respective dynamic assets caches 312(1)-312(5).

Static assets are part of the application user interface 314 and include application code, such as HTML, JavaScript (JS), cascading style sheets (CSS) and images. Progressive Web App (PWA) service workers 318 are used for caching static assets. PWA service workers 318 are configured to a network-first-fallback-to-cache caching strategy, because it is desirable to load the latest version of the app as opposed to loading a previous stale app version from cache, for example.

Dynamic assets are also part of the application user interface 314 and include icons, resource names and additional resource metadata corresponding to files, applications and desktops. Dynamic assets also include actions or notifications. An example notification may be for the user to approve an expense report.

An in-app caching interceptor 320 is used to perform custom in-app caching for the dynamic assets. Dynamic assets correspond to the resources (e.g., apps, desktops) the user is entitled to. A cache-first-fallback-to-network or cache-network-race caching strategy is used for performance reasons.

In an example embodiment, libraries (e.g., a WorxBox and Axios libraries) are used to implement PWA service workers 318 and the in-app caching interceptor 320. The libraries can be a collection of libraries and tools used for generating a service worker, and for pre-caching, routing, and runtime-caching. For example, Axios library is a Javascript library used to make HTTP/HTTPS requests. The Axios library can communicate witha WorxBox library by virtue of the requests it makes. The Axios library is effectively an interceptor for HTTP/HTTPS requests, and is used to implement the in-app caching. The browser local storage (DOM storage) is used for the static assets cache 316 and the dynamic assets caches 312(1)-312(5).

The workspace UI 314 may be configured to implement a health check worker 322 that monitors the health of both the Workspace cloud as a whole and that of the individual feeds 340(1)-340(5). Inputs from the health check worker 322 are used to drive the multi-feed aware cache.

Health checks can be initiated by the workspace UI 314 and/or can be collaboratively performed by the workspace platform 330, which aggregates resources from all the feeds 340(1)-340(5). Further, the workspace platform 330 can send push notifications to the workspace UI 314 upon detecting status changes.

JavaScript (JS) bridge interfaces can be used for communication between the workspace UI 314 and the health check worker 322 on one side, and a workspace app JS bridge host 324 (e.g. native workspace app 70 code) on the other side. For example, the workspace UI 314 and the health check worker 322 can call a JS bridge method to check the overall cloud online status, or to request going online by instructing the workspace app 70 to reach the workspace and attempt authentication. The JS bridge host 324 applies to the workspace app 70 being a native implementation, or to the workspace app 70 being a hybrid implementation (i.e., native and web based).

The workspace UI 314 running in the workspace app 70 is caching the resource feeds 340(1)-340(5) in individual resource caches 312(1)-312(5) per feed. This is not done globally, but instead distinguishes between static and dynamic cache assets. Within the dynamic assets, the assets are cached per feed. The workspace app 70 checks cloud and feed health in order to determine, as it presents the UI, which UI assets should be presented live from workspace and which assets that are leasable and should be presented from the cache without authentication. The client device 310 advantageously performs the separation of static and dynamic per feed caching along with determining a health status of the feeds to decide based on the health status whether a resource should be presented from the cache or should be presented live.

Figure 13:
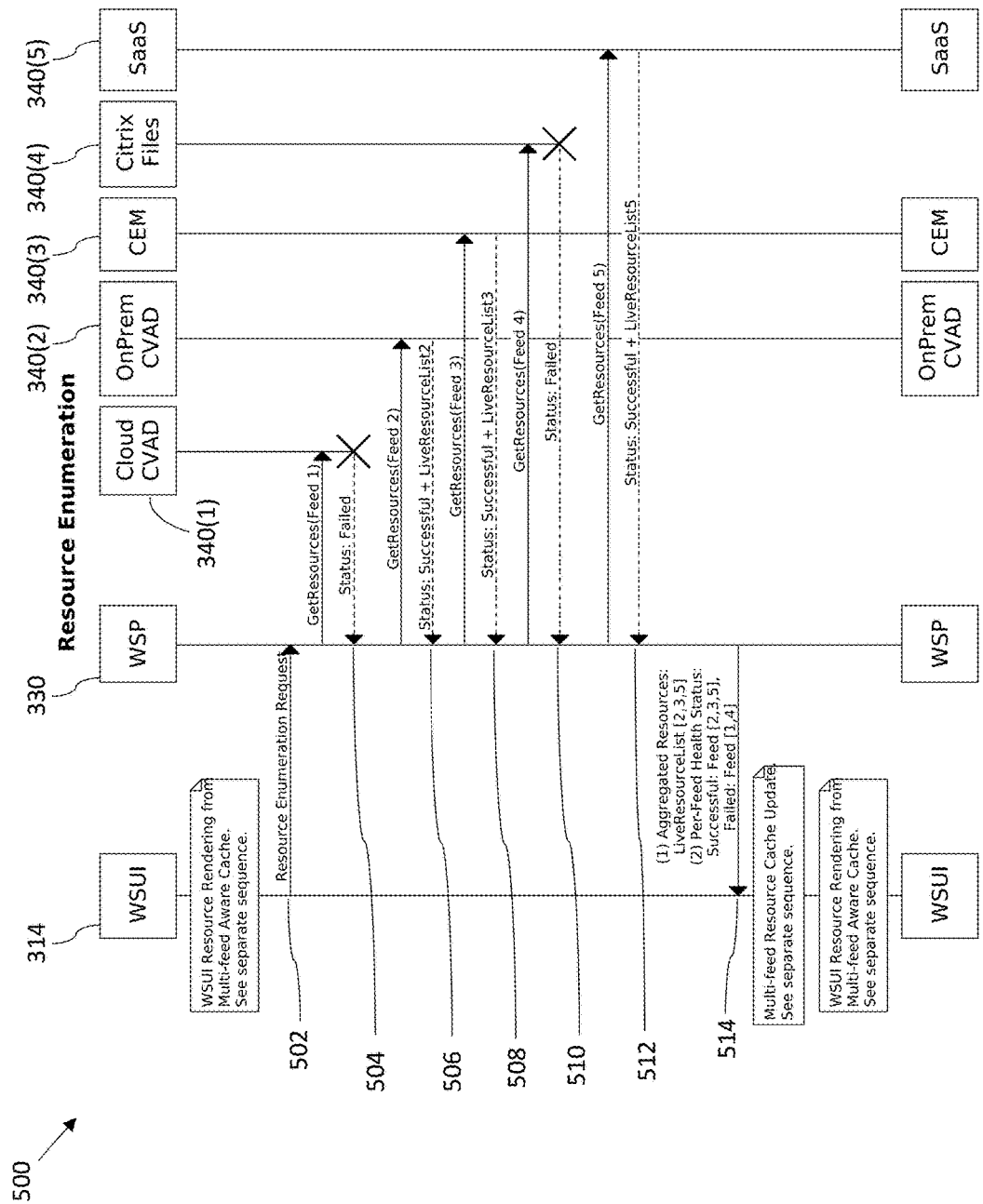
FIG. 13 is a sequence diagram of resource enumeration of the resource feeds for the computing system illustrated in FIG. 7.

Referring now to FIG. 13, a sequence diagram 500 providing multi-feed resource enumeration of the resource feeds 340(1)-340(5) for multi-feed aware caching will be discussed. The workspace UI 314 initiates a resource enumeration request to the workspace platform 330 at line 502.

The workspace platform 330 then determines a status of individual respective feeds and, where the status of a resource feed is successful, a list of resources provided by the resource feed are also enumerated and returned to the workspace UI 314. Resource feed 1 340(1) provides virtual apps and desktops (e.g., CVAD) from the cloud. Status line 504 indicates a failed status for resource feed 1 340(1). Resource feed 2 340(2) provides virtual apps and desktops (e.g., CVAZD) on-premises. Status line 506 indicates a successful status for resource feed 2 340(2), along with enumerated resource list 2. Resource feed 3 340(3) provides endpoint management, such as Citrix Endpoint Management (CEM). Status line 508 indicates a successful status for resource feed 3 340(3), along with enumerated resource list 3. Resource feed 4 340(4) provides content collaboration services, such as Citrix ShareFile. Status line 510 indicates a failed status for resource feed 4 340(4). Resource feed 5 340(5) provides SaaS apps. Status line 512 indicates a successful status for resource feed 5 340(5), along with enumerated resource list 5.

The workspace platform 330 then provides to the workspace UI 314 at line 514 the aggregated resources that are successful, and updates the health status of each resource feed. The per feed health status corresponds to the availability of a particular resource feed (i.e., successful or failed). In this example, resource feeds 2 340(2), 3 340(3) and 5 340(5) are successful and resource feeds 1 340(1), and 4 340(4) have failed. The respective resource caches 312(1)-312(5) are updated for the resources that are available, and updated with the health status of each resource feed.

Figure 14:
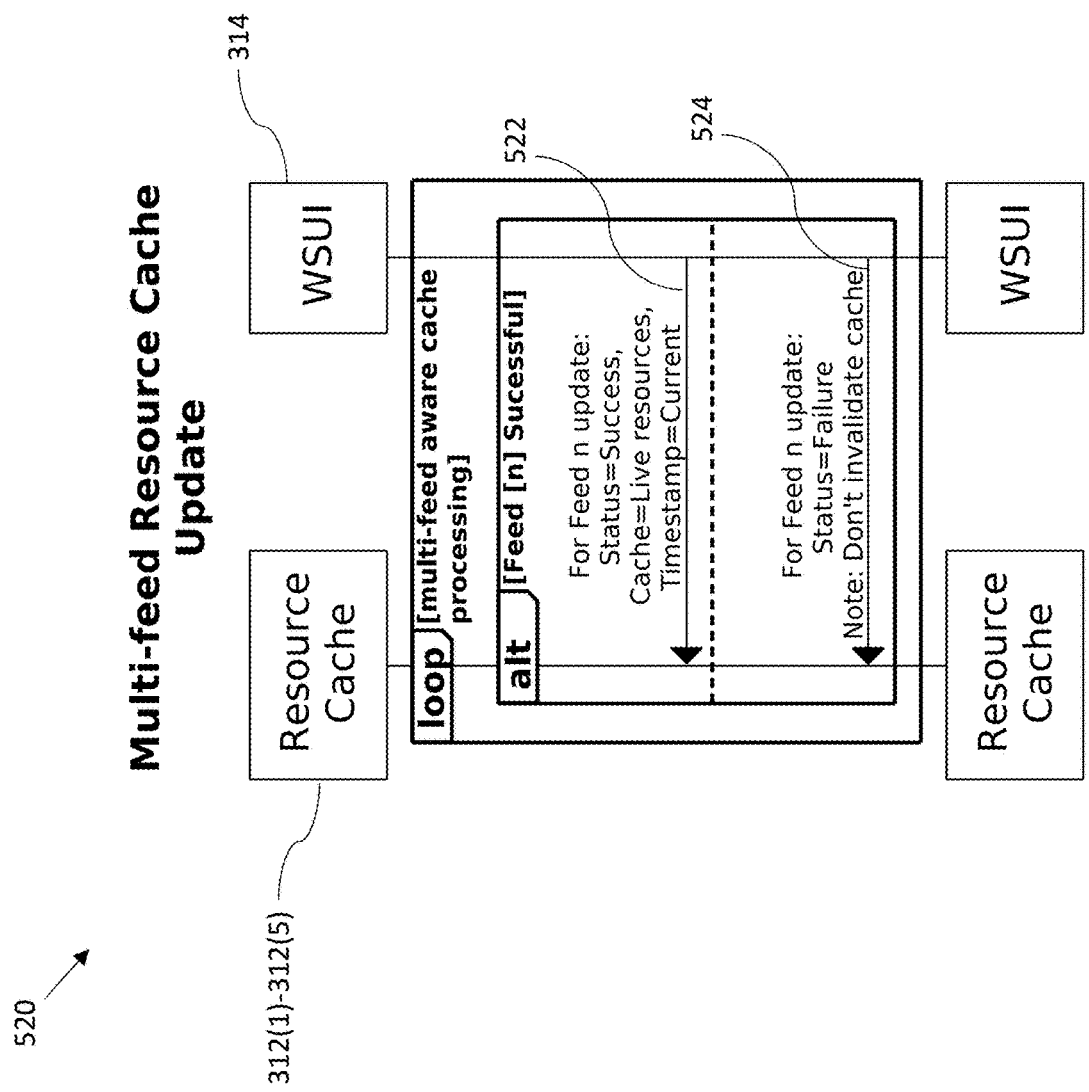
FIG. 14 is a sequence diagram of updating the multi-feed resource cache for the computing system illustrated in FIG. 7.

Referring now to FIG. 14, a sequence diagram 520 of updating the multi-feed resource caches 312(1)-312(5) will be discussed. Updates are provided to the resource caches 312(1)-312(5) by the workspace UI 314. The updates are part of a loop process. Line 522 corresponds to the resource feeds that have a success status. Resource caches 2 312(2), 3 312(3) and 5 312(5) are updated with a successful status along with a timestamp. Line 524 corresponds to the resource feeds that have a failed status. Resource caches 1 312(1) and 4 312(4) are updated with a failed status. In this case, these resource caches are not invalidated.

Figure 15:
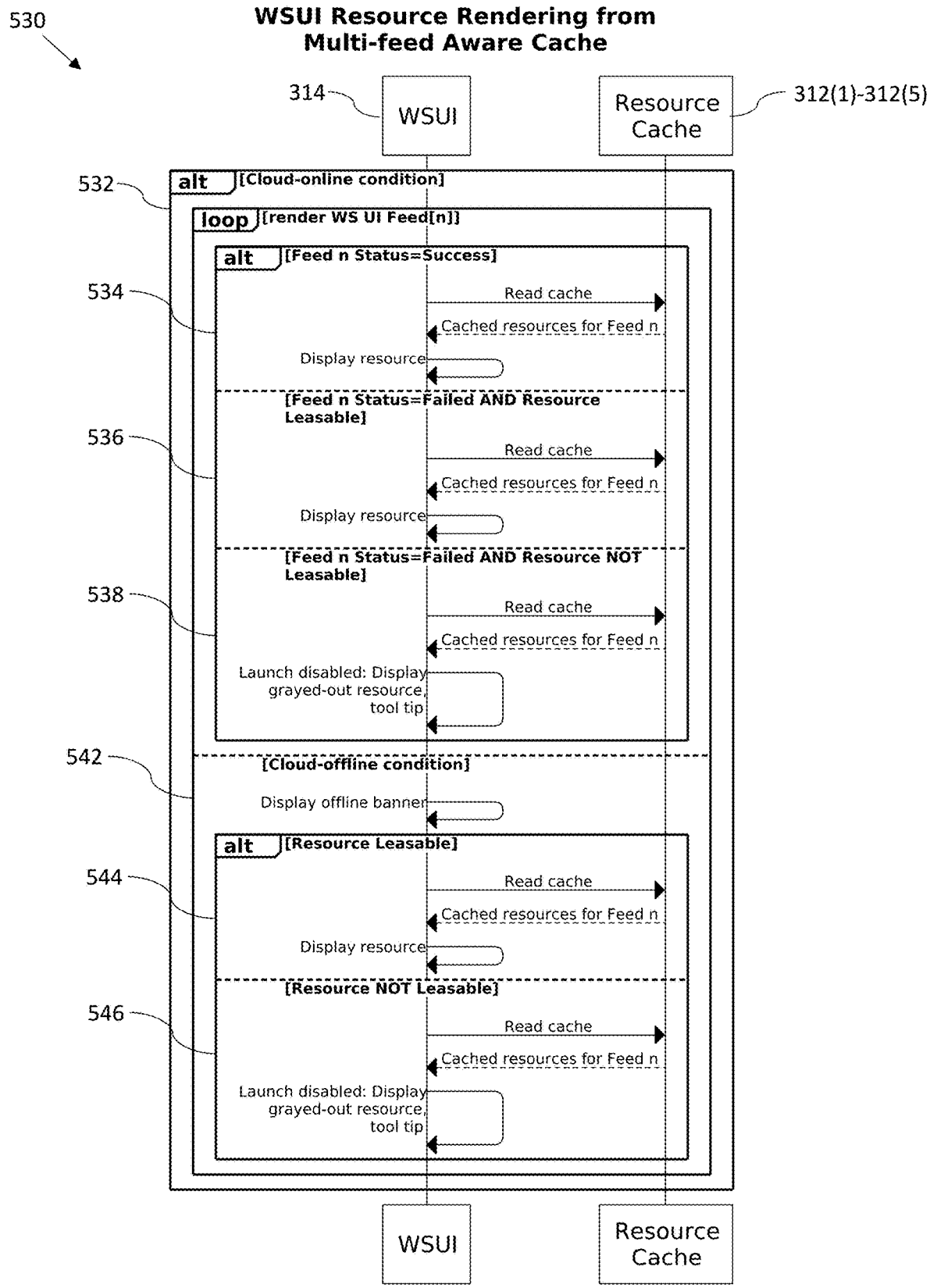
FIG. 15 is a sequence diagram of resource rendering from the multi-feed resource cache for the computing system illustrated in FIG. 7.

Referring now to FIG. 15, a sequence diagram 530 of resource rendering from the multi-feed resource caches 312(1)-312(5) will be discussed. The workspace app 70 renders the UI based off the individual health and availability of the resource feeds 340(1)-340(5). The sequence diagram 530 provides for a cloud-online condition 532 and a cloud-offline condition 542. A loop process is implemented for both conditions with respect to rendering of the resources.

The cloud-online condition 532 refers to the condition where Internet connection to the cloud is available and the workspace platform 330 is reachable from the workspace UI 314. In this condition, some or all of the resource feeds 340(1)-340(5) may be available, and some or all of the resource feeds 340(1)-340(5) may not be available. The cloud-offline condition 542 refers to the condition where Internet connection to the cloud is not available and the workspace platform 330 is unreachable from the workspace UI 314, or the workspace platform 330 is generally unresponsive. Naturally, in this condition, each of the resource feeds 340(1)-340(5) is unavailable.

Figure 11:
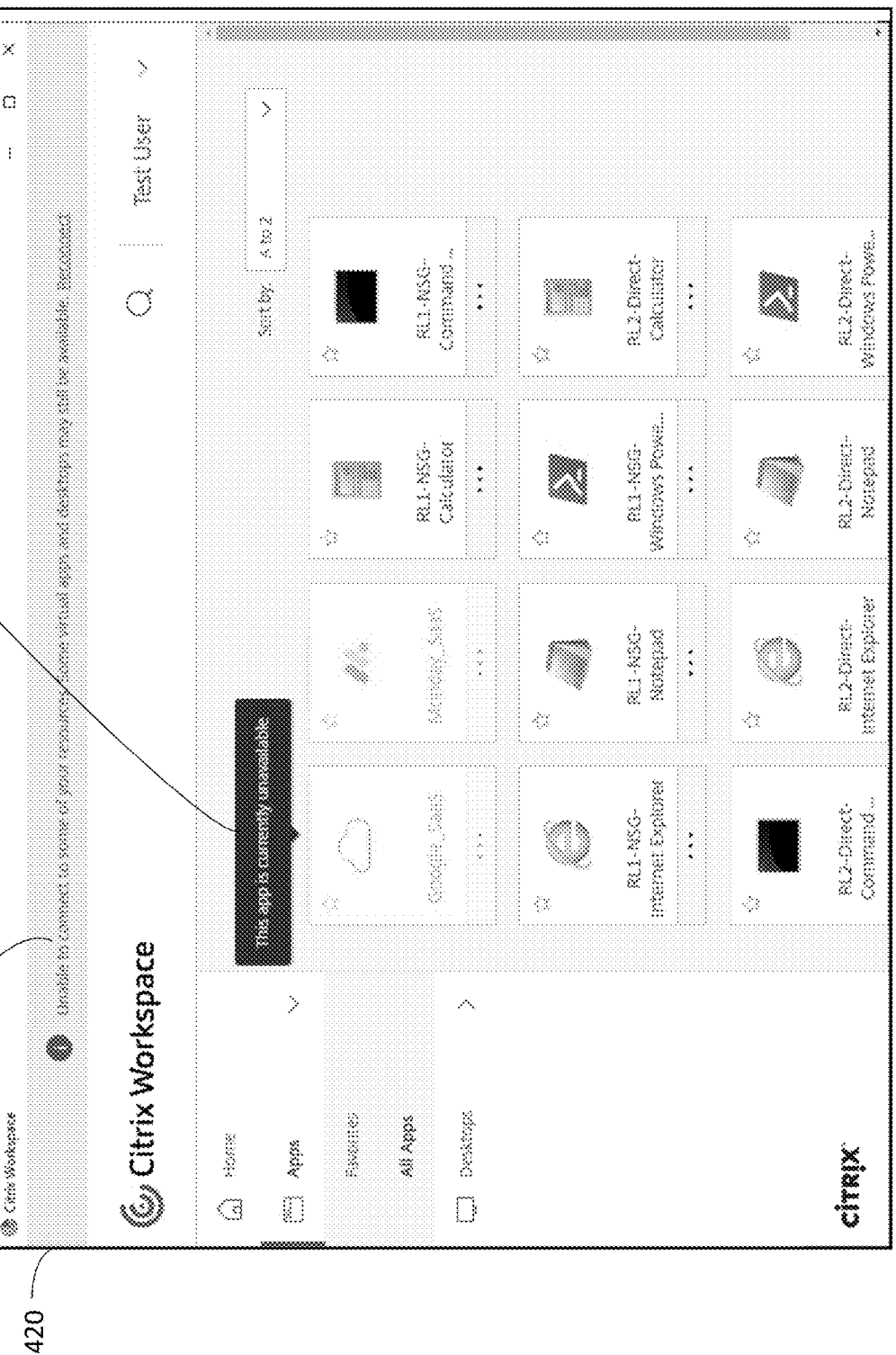
FIG. 11 is a screenshot providing a grayed-out application icon and a message that the application is currently unavailable since the application is not leasable to the client device illustrated in FIG. 7.

For the cloud-online condition 532, a resource feed is either successful or has failed, and if the resource feed has failed, then the resource may be leasable or not leasable. Leasable means that the cloud service is capable of issuing connection leases for this resource type. In section 534, if a resource feed status is successful, then the workspace UI 314 displays the resource. In section 536, if a resource feed status has failed and the resource is leasable, then the workspace UI 314 displays the resource because it is leasable. This means the resource could essentially be presented from the resource cache. In section 538, if a resource feed status has failed and the resource is not leasable, then the workspace UI 314 disables launch and displays a grayed-out (i.e. unavailable, unusable, not launchable) resource, as illustrated in FIG. 11. For example, the resource could be a SaaS or web app.

In the cloud-offline condition 542 an offline banner is displayed. The offline banner lets the user know that they are off-line (i.e., each resource feed has failed) and the user can manually refresh, or if the refresh happens automatically, then the user will be prompted for authentication. In section 544, if the resource is leasable, then the workspace UI 314 reads from the corresponding resource cache and displays the resource. In section 546, if the resource is not leasable, then then the workspace UI 314 disables launch of the resource and displays the resource as grayed-out (i.e. unavailable, unusable, not launchable), as illustrated in FIG. 11.

To handle the case of a Kiosk/shared device, both group-level resource cache and group-level connection leases may be used. Normally, the resource cache and the connection leases are user-device bound, i.e., they are user-specific.

By using group-level resource cache and connection leases, the logout behavior may be modified. The Kiosk/shared device continues to persist static assets. Upon logout, user-specific UI resources and connection leases are removed, as opposed to keeping UI cache for performance reasons in the non-Kiosk case. Also upon logout, group-level UI resources and connection leases are kept on the Kiosk/shared device. This allows users to crowd source the retrieval/caching of dynamic assets that are shared between users in a resource group and the corresponding connection leases. For example, doctors and nurses in a hospital would all share the same apps.

However, not all Kiosk/shared device scenarios are as clean or straightforward as the hospital example above. In some cases, users may have user-specific resource entitlements. To allow for that in a Kiosk/shared device scenario, the user's resource cache and connection leases may not be removed upon log out. That requires a very strong device-level protection of the cache and connection leases, especially the connection leases. A local device authentication could be imposed to allow access to user-specific cache and connection leases in an offline/cloud-outage condition. The local authentication may be provided using a local pin or biometric.

Even with this optimization it is assumed that the combined user population would have visited all (or a substantial number) of Kiosk/shared devices within the connection lease expiration period, which may not be the case. It is also assumed that a specific user would have visited the same Kiosk/shared devices they are currently on within the connection lease expiration period, in order to successfully use the user-specific cache and connection leases. This may also be false. Furthermore, the Kiosk/shared devices may be completely stateless, i.e. unable to persistently store resource caches and connection leases, or otherwise lose state after a reboot.

Therefore, the approach described is useful in some Kiosk/shared device scenarios but only best effort in others. For example, it is a best effort to allow resiliency in early morning outage for users that just walk up to a terminal: user-specific entitlements (non-shared resource group) may not be available. Once caching is performed and connection leases are synched, a mid-day outage will be successfully handled assuming the user is on the same device.

Figure 16:
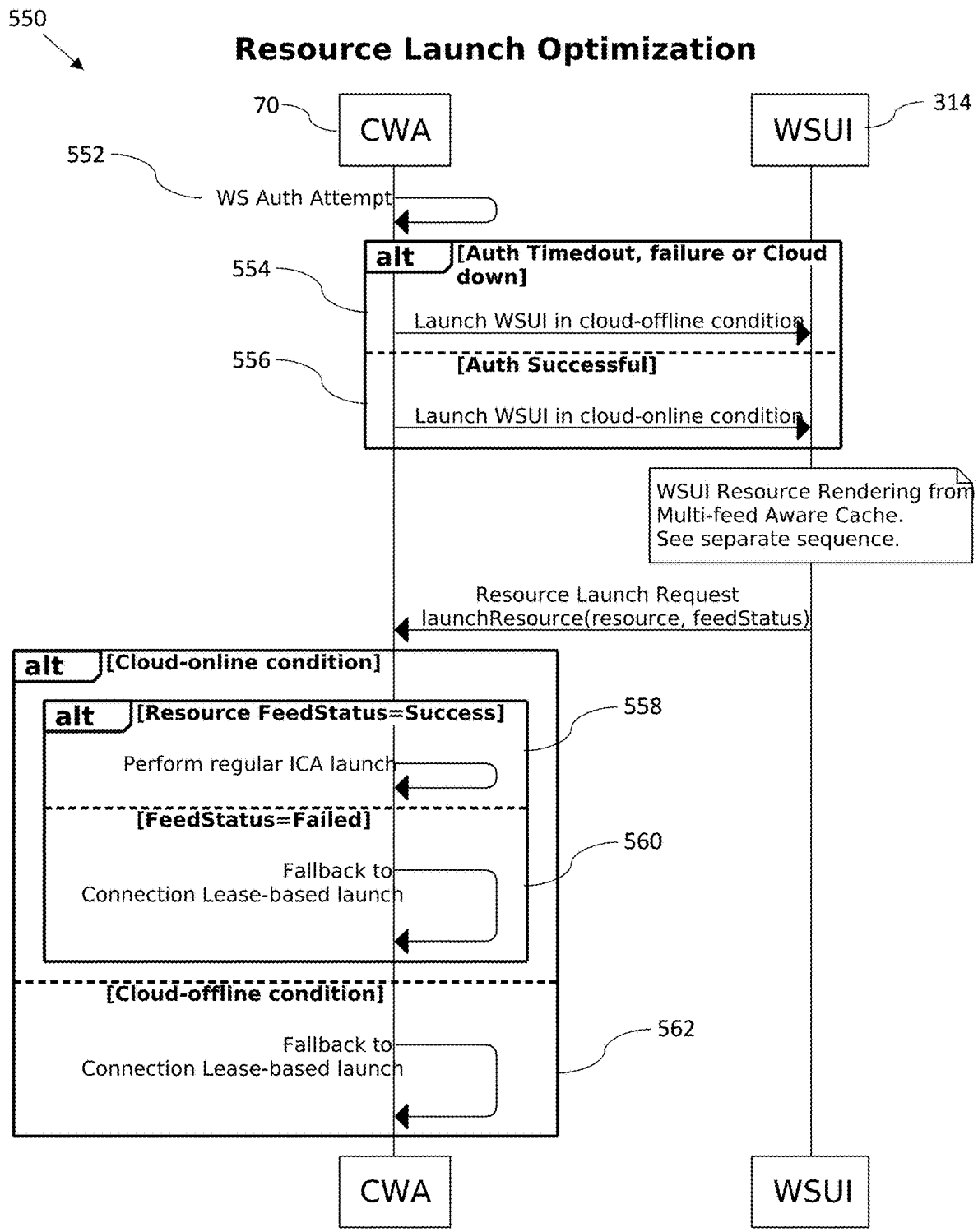
FIG. 16 is a sequence diagram of resource launch optimization for the computing system illustrated in FIG. 7.

Referring now to FIG. 16, a sequence diagram 550 providing resource launch optimization for the client device 310 will be discussed. This is an example of connection time optimization based on both overall Workspace cloud online/offline condition and resource cache status: live (success) or from cache (failed). The usefulness of this example optimization assumes a workspace virtual app and desktop (e.g., CVAD) policy preference of "ICA file first, fallback to connection leases". An ICA file may be generally referred to as a launch method and an authentication protocol. Such policy preference may exist due to lack of single sign-on (SSOn) support in VDA sessions or other reasons.

Initially, when the workspace app 70 starts, an attempt is made to authenticate the user to the workspace at line 552. If the authentication attempt fails for whatever reason, e.g., the cloud is down, the identity provider is down or slow to respond, user mistypes their credentials, etc., then, as previously discussed, the workspace UI 314 is still presented but in an cloud-offline mode with banner and reconnect button, as provided in section 554. Otherwise, if authentication to the workspace is successful, then the cloud-online condition is assumed and the workspace UI 314 is loaded without the banner and reconnect button as provided in section 556.

Following a resource launch request, in a cloud-online condition, if a resource is live, then ICA-first is preferred, consistent with the policy preference, as provided in section 558. In the cloud-online condition, if a resource is cached, the policy preference is inverted and connection lease first is preferred to avoid a long ICA file retrieval timeout during cloud outage, followed by eventual fallback to connection lease launch which would hurt user experience, as provided in section 560. This may happen if the user initially successfully authenticates and enumerates workspace resources but later, as detected by the caching, network connectivity is lost, or connectivity is still present but a specific workspace feed is down, in this example for cloud virtual apps and desktops (e.g., CVAD).

In a cloud-offline condition, the policy preference is also inverted and connection lease first is preferred to avoid a long ICA file retrieval timeout, as provided in section 562.

As an alternative embodiment to the multi-feed resource caching, a selective UI cache merge (union operation) may be performed based on a single global partial enumeration error status. With this approach the cache is not updated, i.e., the resource is not removed, for a resource that is leasable.

An essential difference between the selective UI cache merge and the multi-feed resource caching is that multi-feed resource caching provides a per feed status, whereas in this selective UI cache merge approach the workspace platform 330 just communicates that one of the feeds is not healthy. Thus, the workspace platform 330 does not communicate granular per-feed status but still communicates that the resource enumeration was not complete, i.e. there is a partial enumeration error status.

In both of the multi-feed resource caching approach previously described in detail and the selective UI cache merge approach, two cases are considered: the partial enumeration and the failed enumeration. In both cases, if a resource is leasable, e.g. as indicated by a flag in the resource metadata, then it is not removed from the cache. If a resources is not leasable, then it is removed from the cache.

Thus, although there is no per-feed granularity of status, there is still a correlation because the workspace platform 330 conveys that the resource enumeration is not complete. Every leasable resource is cached and presented regardless of the individual field status.

However, the selective UI cache merge approach has a few limitations. The virtual apps and desktops (e.g., CVAD) resources presented may be stale if another service is down. For example, an administrator may have removed App Z from the CVAD entitlements, CVAD broker is up, but on-prem StoreFront (SF) or Citrix Files are down. Then App Z is still presented to the user from cached assets. The user is able to see the stale resource. Launch could also succeed through a Local Host Cache (LHC), which is a high-availability backup broker for a cloud-based CVAD broker.

Another limitation is that there is a longer connect time for virtual apps and desktops (e.g., CVAD) resources. For example, if the CVAD broker is down, the workspace app 70 does not know which service specifically is down. So the workspace app 70 has to try ICA file first before falling back to connection lease as a launch and authentication method. As a result, the workspace app 70 will time-out (e.g., after 20 seconds) before falling back to connection leases. In contrast, if per-feed status is supported by the workspace platform 330 and workspace UI 314, and therefore the workspace UI 314 is aware that the CVAD broker is down, the workspace app 70 will directly use connection leases (as is the optimized behavior in an offline/cloud outage condition).

Figure 17:
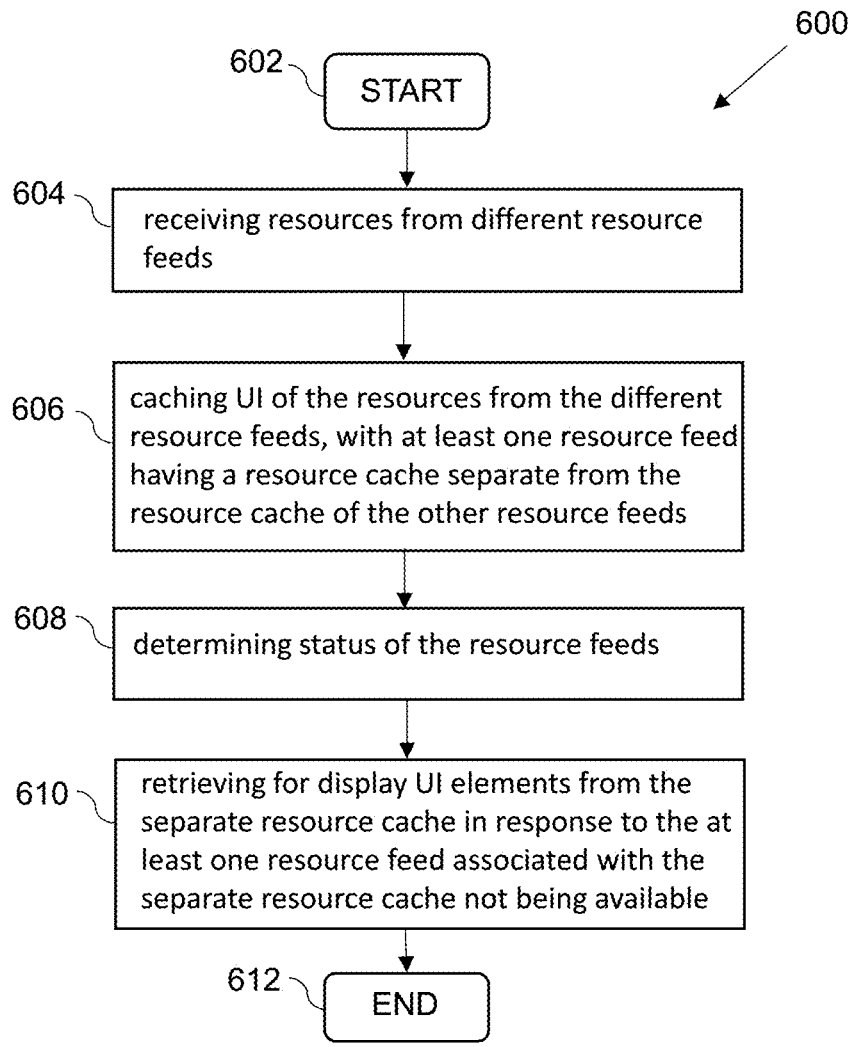
FIG. 17 is a flowchart illustrating a method for operating the client device illustrated in FIG. 7.

Referring now to FIG. 17, a flowchart 600 illustrating a method for operating the client device 310 will be discussed. From the start (Block 602), the method includes receiving resources from different resource feeds 340(1)-340(5) at Block 604. The method further includes caching 312(1)-312(5) user interface (UI) of the resources from the different resource feeds 340(1)-340(5) at Block 606, with at least one resource feed having a resource cache separate from the resource cache of the other resource feeds. Statuses of the resource feeds 340(1)-340(5) are determined at Block 608. The method further includes retrieving for display UI elements from the separate resource cache at Block 610 in response to the at least one resource feed associated with the separate resource cache not being available. The method ends at Block 612.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A client device comprising:
a plurality of resource caches; and
a processor coupled to said plurality of resource caches, and configured to perform the following:
receive resources from a plurality of different resource feeds,
cache user interfaces (UI) of the resources from the plurality of different resource feeds, with at least one resource feed having a resource cache separate from the resource cache of the other resource feeds,
determine status of the resource feeds, with at least one status indicating availability of the at least one resource feed having the separate resource cache,
retrieve UI elements from the separate resource cache in response to the at least one resource feed associated with the separate resource cache not being available, and
display the retrieved UI elements from the separate resource cache;
wherein user authentication to launch at least one of the resources is provided by using an authentication protocol or by using a connection lease, and wherein said processor is configured to perform the following:
start with using the authentication protocol first before falling back to the connection lease in response to the at least one resource feed providing the resource to be launched being available; and
start with using the connection lease first before falling back to the authentication protocol in response to the at least one resource feed providing the resource to be launched not being available.

2. The client device according to claim 1 wherein each resource feed has a respective resource cache separate from the resource caches of the other resource feeds, and wherein said processor is further configured to determine the status of each resource feed, and in response to the resource feeds that are not available, retrieve for display the UI elements from the respective resource caches of the resource feeds that are not available.

3. The client device according to claim 1 wherein the at least one resource feed having the separate resource cache is not available and the at least one resource associated therewith is leasable, and wherein said processor is further configured to display the UI elements.

4. The client device according to claim 1 wherein the at least one resource feed having the separate resource cache is not available and the at least one resource associated therewith is not leasable, and wherein said processor is further configured to display the UI elements as at least one of unavailable, unusable, grayed-out and not launchable.

5. The client device according to claim 1 wherein said processor is further configured to perform the following:
   determine static assets in the resources of the plurality of different resource feeds, with the static assets including application code; and
   determine dynamic assets in the resources of the plurality of different resource feeds, with the dynamic assets including at least one of application icons, desktop icons, file icons, resource names, and notifications.

6. The client device according to claim 5 wherein the plurality of resource caches comprises a static assets resource cache and a plurality of dynamic assets resource caches, with at least one dynamic assets resource cache corresponding to a particular resource feed, and wherein said processor is further configured to perform the following:
   cache the static assets in the static assets resource cache; and
   cache the dynamic assets in the plurality of dynamic assets resource caches.

7. The client device according to claim 1 wherein said processor is further configured to perform the following:
   determine a status of the client device having a network connection to cloud services; and
   display an offline banner notifying a user that the client device is off-line and the resources may not be available in response to there being no network connection.

8. The client device according to claim 7 wherein a cloud-based authentication of the user to launch a particular resource is not available in response to there being no network connection, and wherein said processor is further configured to prompt the user for local authentication for the particular resource to be launched, with the local authentication including at least one of a local personal identification number (PIN) and biometrics.

9. The client device according to claim 1 wherein said processor is further configured to perform the following:
   determine a health status of a cloud service the client device is connected to; and
   display an offline banner notifying a user that the client device is off-line and the resources may not be available in response to the health status of the cloud service indicating that the cloud service is unavailable.

10. A method comprising:
    receiving resources from a plurality of different resource feeds;
    caching user interfaces (UI) of the resources from the plurality of different resource feeds, with at least one resource feed having a resource cache separate from the resource cache of the other resource feeds;
    determining status of the resource feeds, with at least one status indicating availability of the at least one resource feed having the separate resource cache;
    retrieving UI elements from the separate resource cache in response to the at least one resource feed associated with the separate resource cache not being available; and
    displaying the retrieved UI elements from the separate resource cache;
    wherein user authentication to launch at least one of the resources is provided by using an authentication protocol or by using a connection lease, and further comprising:
    starting with using the authentication protocol first before falling back to the connection lease in response to the at least one resource feed providing the resource to be launched being available; and
    starting with using the connection lease first before falling back to the authentication protocol in response to the at least one resource feed providing the resource to be launched not being available.

11. The method according to claim 10 wherein each resource feed has a respective resource cache separate from the resource caches of the other resource feeds, and wherein the status of each resource feed is determined, and in response to the resource feeds that are not available, retrieving for display the UI elements from the respective resource caches of the resource feeds that are not available.

12. The method according to claim 10 wherein the at least one resource feed having the separate resource cache is not available and the at least one resource associated therewith is leasable, and further comprising displaying the UI elements.

13. The method according to claim 10 wherein the at least one resource feed having the separate resource cache is not available and the at least one resource associated therewith is not leasable, and further comprising displaying the UI elements as at least one of unavailable, unusable, grayed-out and not launchable.

14. The method according to claim 10 further comprising:
    determining static assets in the resources of the plurality of different resource feeds, with the static assets including application code; and
    determining dynamic assets in the resources of the plurality of different resource feeds, with the dynamic assets including at least one of application icons, desktop icons, file icons, resource names, and notifications.

15. The method according to claim 10 wherein the plurality of resource caches comprises a static assets resource cache and a plurality of dynamic assets resource caches, with at least one dynamic assets resource cache corresponding to particular resource feed, and further comprising:
    caching the static assets in the static assets resource cache; and
    caching the dynamic assets in the plurality of dynamic assets resource caches.

16. The method according to claim 10 further comprising:
    determining a status of the client device having a network connection to cloud services; and
    displaying an offline banner notifying a user that the client device is off-line and the resources may not be available in response to there being no network connection.

17. The method according to claim 16 wherein a cloud-based authentication of the user to launch a particular resource is not available in response to there being no network connection, and further comprising prompting the user for local authentication for the particular resource to be launched, with the local authentication including at least one of a local personal identification number (PIN) and biometrics.

18. The method according to claim 10 further comprising:
    determining a health status of a cloud service the client device is connected to; and
    displaying an offline banner notifying a user that the client device is off-line and the resources may not be available in response to the health status of the cloud service indicating that the cloud service is unavailable.

19. A computing system comprising:
a server configured to receive resources from a plurality of different resource feeds; and
a client device configured to perform the following:
- cache user interfaces (UI) of the resources from the plurality of different resource feeds, with at least one resource feed having a resource cache separate from the resource cache of the other resource feeds,
- determine status of the resource feeds, with at least one status indicating availability of the at least one resource feed having the resource cache separate from the resource cache of the other resource feeds,
- in response to the at least one resource feed having the resource cache separate from the resource cache of the other resource feeds not being available,
  - retrieve UI elements from the resource cache that is separate from the resource caches of the other resource feeds, and
  - display the retrieved UI elements from the separate resource cache;

wherein user authentication to launch at least one of the resources is provided by using an authentication protocol or by using a connection lease, and further comprising:
- starting with using the authentication protocol first before falling back to the connection lease in response to the at least one resource feed providing the resource to be launched being available; and
- starting with using the connection lease first before falling back to the authentication protocol in response to the at least one resource feed providing the resource to be launched not being available.

20. The computing system according to claim 19 wherein said client device is further configured so that each resource feed has a respective resource cache separate from the resource caches of the other resource feeds, and wherein the status of each resource feed is determined, and in response to the resource feeds that are not available, retrieve for display the UI elements from the respective resource caches of the resource feeds that are not available.

* * * * *